United States Patent
Kurosawa et al.

(10) Patent No.: US 10,122,145 B2
(45) Date of Patent: Nov. 6, 2018

(54) LASER APPARATUS AND EXTREME ULTRAVIOLET LIGHT GENERATION SYSTEM

(71) Applicant: GIGAPHOTON INC., Tochigi (JP)

(72) Inventors: Yoshiaki Kurosawa, Oyama (JP); Hideo Hoshino, Oyama (JP)

(73) Assignee: Gigaphoton Inc., Tochigi (JP)

(*) Notice: Subject to any disclaimer, the term of this patent is extended or adjusted under 35 U.S.C. 154(b) by 0 days.

(21) Appl. No.: 15/651,253

(22) Filed: Jul. 17, 2017

(65) Prior Publication Data

US 2017/0317464 A1   Nov. 2, 2017

Related U.S. Application Data

(63) Continuation of application No. PCT/JP2015/056653, filed on Mar. 6, 2015.

(51) Int. Cl.
| | |
|---|---|
| *H01S 3/10* | (2006.01) |
| *H01S 3/00* | (2006.01) |
| *H01S 3/034* | (2006.01) |
| *H01S 3/08* | (2006.01) |

(Continued)

(52) U.S. Cl.
CPC ........ *H01S 3/10007* (2013.01); *H01S 3/0064* (2013.01); *H01S 3/0071* (2013.01);
(Continued)

(58) Field of Classification Search
CPC ...... H01S 3/1007; H01S 3/0071; H01S 3/034; H01S 3/08072; H01S 2301/02;
(Continued)

(56) References Cited

U.S. PATENT DOCUMENTS

| | | | |
|---|---|---|---|
| 6,069,730 A | 5/2000 | Injeyan et al. | |
| 2010/0171049 A1* | 7/2010 | Moriya | H05G 2/003 |
| | | | 250/504 R |

(Continued)

FOREIGN PATENT DOCUMENTS

| | | |
|---|---|---|
| JP | S46-019270 B | 5/1971 |
| JP | 2000-068578 A | 3/2000 |

(Continued)

OTHER PUBLICATIONS

International Search Report issued in PCT/JP2015/056653; dated Jun. 2, 2015.
Written Opinion issued in PCT/JP2015/056653; dated Jun. 2, 2015.

*Primary Examiner* — David E Smith
(74) *Attorney, Agent, or Firm* — Studebaker & Brackett PC

(57) ABSTRACT

A laser apparatus may include a master oscillator, a plurality of amplifiers, a photodetector device configured to detect a light beam traveling back along a laser beam path, and a controller. The photodetector device may include a first photodetector configured to detect energy of a light beam traveling back along the laser beam path and a second photodetector configured to detect power of the light beam traveling back along the laser beam path. The controller may be configured to determine that a return beam is generated when the intensity of the energy detection signal exceeds a first threshold. The controller may be configured to determine that a self-oscillation beam is generated when the intensity of the power detection signal exceeds a second threshold.

16 Claims, 15 Drawing Sheets

(51) Int. Cl.
*H01S 3/095* (2006.01)
*H01S 3/23* (2006.01)
*H05G 2/00* (2006.01)
*H01S 3/097* (2006.01)

(52) U.S. Cl.
CPC .......... *H01S 3/034* (2013.01); *H01S 3/08072* (2013.01); *H01S 3/095* (2013.01); *H01S 3/1003* (2013.01); *H01S 3/2308* (2013.01); *H01S 3/2316* (2013.01); *H05G 2/008* (2013.01); *H01S 3/09702* (2013.01); *H01S 3/10069* (2013.01); *H01S 2301/02* (2013.01)

(58) Field of Classification Search
CPC .......... H05G 2/00; H05G 2/001; H05G 2/003; H05G 2/005; H05G 2/006; H05G 2/008
See application file for complete search history.

(56) References Cited

U.S. PATENT DOCUMENTS

2014/0346374 A1   11/2014  Yanagida et al.
2014/0346375 A1*  11/2014  Nowak ............... H01S 3/10015
                                              250/504 R

FOREIGN PATENT DOCUMENTS

| JP | 2008-042048 A |   | 2/2008  |
|----|---------------|---|---------|
| JP | 2008-283107 A |   | 11/2008 |
| JP | 2008283107 A  | * | 11/2008 |
| JP | 2011-014547 A |   | 1/2011  |
| JP | 2012-147022 A |   | 8/2012  |
| JP | 2013-207298 A |   | 10/2013 |
| JP | 2013-218286 A |   | 10/2013 |

* cited by examiner

LASER APPARATUS AND EXTREME ULTRAVIOLET LIGHT GENERATION SYSTEM

CROSS-REFERENCE TO RELATED APPLICATIONS

The present application is a continuation application of International Application No. PCT/JP2015/056653 filed on Mar. 6, 2015, the content of which is hereby incorporated by reference into this application.

BACKGROUND

1. Technical Field

This disclosure relates to a laser apparatus and an extreme ultraviolet light generation system.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 70 nm to 45 nm, and further, microfabrication with feature sizes of 32 nm or less will be required. In order to meet the demand for microfabrication with feature sizes of 32 nm or less, for example, the development of an exposure apparatus is expected in which a system for generating extreme ultraviolet (EUV) light at a wavelength of approximately 13 nm is combined with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used to generate plasma.

SUMMARY

An example of the disclosure may be a laser apparatus including a master oscillator, a plurality of amplifiers, a photodetector device, and a controller. The master oscillator may be configured to output a laser beam to travel along a laser beam path. The plurality of amplifiers may be configured to amplify the laser beam outputted by the master oscillator on the laser beam path. The photodetector device may include a first photodetector configured to detect energy of a light beam traveling back along the laser beam path and a second photodetector configured to detect power of the light beam traveling back along the laser beam path. The controller may be configured to receive an energy detection signal from the first photodetector and a power detection signal from the second photodetector, monitor intensities of the energy detection signal and the power detection signal, determine that a return beam is generated when the intensity of the energy detection signal exceeds a first threshold, determine that a self-oscillation beam is generated when the intensity of the power detection signal exceeds a second threshold, and store determination results about the return beam and the self-oscillation beam to a memory.

Another example of the disclosure may be a laser apparatus including a master oscillator, a plurality of amplifiers, a photodetector device, and a controller. The master oscillator may be configured to output a laser beam to travel along a laser beam path. The plurality of amplifiers may be configured to amplify the laser beam outputted by the master oscillator on the laser beam path. The photodetector device may be configured to detect a light beam traveling back along the laser beam path. The controller may be configured to determine that a return beam is generated when intensity of a detection signal from the photodetector device has been higher than a first threshold for a time longer than 0 and equal to or shorter than a second threshold, determine that a self-oscillation beam is generated when intensity of the detection signal has been higher than a third threshold for a time longer than a fourth threshold which is equal to or longer than the second threshold, and store determination results about the return beam and the self-oscillation beam to a memory.

BRIEF DESCRIPTION OF THE DRAWINGS

Hereinafter, selected embodiments of the present disclosure will be described with reference to the accompanying drawings.

DETAILED DESCRIPTION

Figure 1:
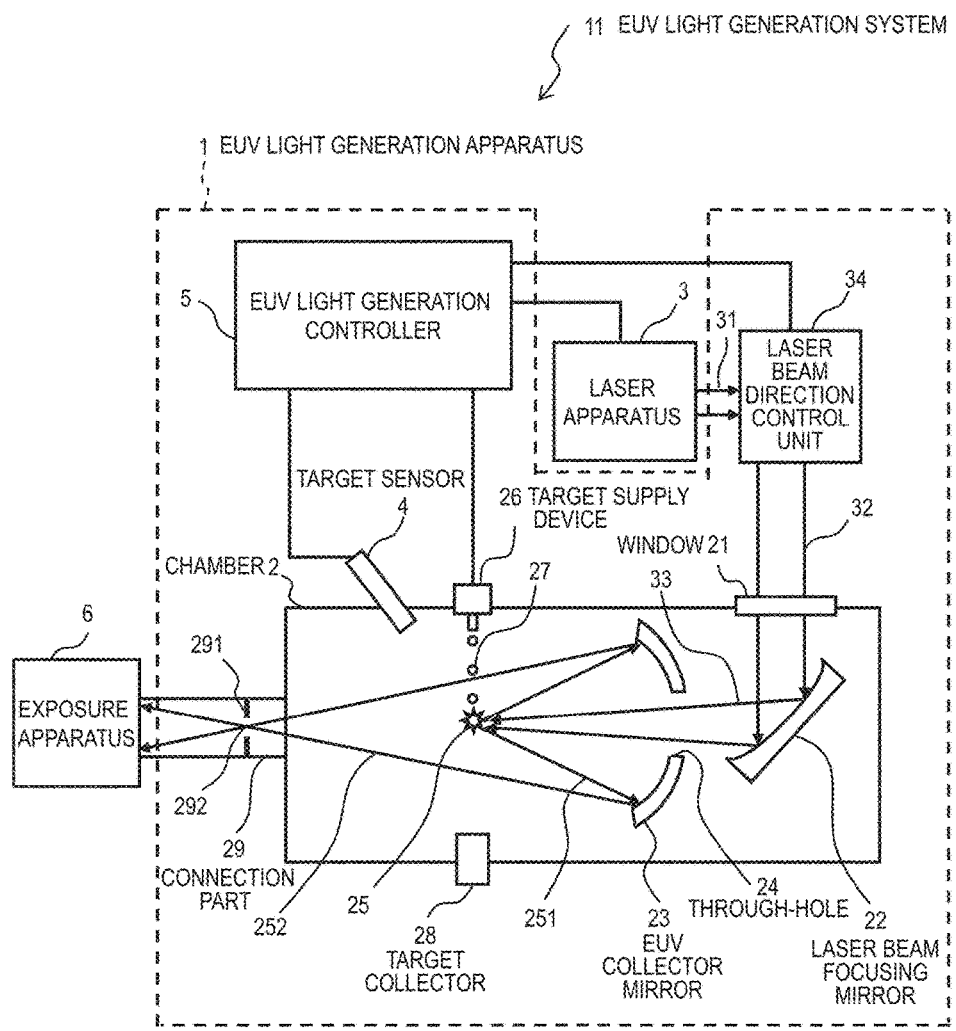
FIG. 1 schematically illustrates an exemplary configuration of an LPP type EUV light generation system.

Contents
1. Overview
2. Overview of EUV Light Generation System
   Configuration
   Operation
3. Details of EUV Light Generation System
   Configuration
   Operation
   Issues
4. Embodiment 1
   Configuration
   Operation
   Effects
5. Embodiment 2
   Configuration
   Operation
   Effects
6. Description of Components
6.1 Optical Isolator
   Configuration
   Operation
6.2. Beam Adjuster
   Configuration
   Operation
6.3 Controllers
   Configuration
   Operation
   Connected Devices Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

1. Overview

An LPP type EUV light generation system may generate EUV light by irradiating a target with a pulse laser beam outputted by a laser apparatus. In order to increase the output power of EUV light, it may be demanded to increase the power of the laser beam as well. The laser apparatus may include a master oscillator and an amplifier.

To increase the power of the laser beam, a higher-gain amplifier may be used to raise the amplification rate. However, this may also increase the intensity of the reflection of the laser beam off a target (a return beam). Furthermore, the return beam may travel back along the laser beam path and amplified by the amplifier to become more intensive. In traveling back along the laser beam path, the intensive return beam may damage the optical elements on the laser beam path.

Meanwhile, in the case where the laser apparatus includes multiple amplifiers, a self-oscillation beam may be generated. The self-oscillation beam may travel toward the master oscillator and/or a target. The self-oscillation beam may be unexpectedly focused on the laser beam path to damage the optical element at which the beam is focused.

An example in this disclosure may analyze the temporal variation in detection signal of the light traveling back along the laser beam path to determine whether the detection signal includes a waveform caused by either a return beam or a self-oscillation beam. As a result, appropriate measures may be taken against the generation of a return beam or self-oscillation beam.

2. Overview of EUV Light Generation System configuration

FIG. 1 schematically illustrates an exemplary configuration of an LPP type EUV light generation system. An EUV light generation apparatus 1 may be used with at least one laser apparatus 3. Hereinafter, a system that includes the EUV light generation apparatus 1 and the laser apparatus 3 may be referred to as an EUV light generation system 11. As shown in FIG. 1 and described in detail below, the EUV light generation apparatus 1 may include a chamber 2 and a target supply device 26 (for example, droplet generator). The chamber 2 may be sealed airtight. The target supply device 26 may be mounted onto a wall of the chamber 2, for example. A target material to be supplied by the target supply device 26 may include, but is not limited to, tin, terbium, gadolinium, lithium, xenon, or any combination thereof.

The chamber 2 may have at least one through-hole formed in its wall. A pulse laser beam 32 outputted from the laser apparatus 3 may travel through the through-hole. At least one window 21 may be installed on the chamber 2 and the pulse laser beam 32 outputted from the laser apparatus 3 may travel through the window 21. An EUV collector mirror 23 having, for example, a spheroidal reflective surface may be provided in the chamber 2. The EUV collector mirror 23 may have a first focal point and a second focal point.

The EUV collector mirror 23 may have, for example, a multi-layered reflective film including alternately laminated molybdenum layers and silicon layers formed on the surface thereof. For example, the EUV collector mirror 23 is preferably positioned such that the first focal point lies in a plasma generation position (plasma generation region 25) or in the vicinity and the second focal point lies at a desired focal point defined by the specifications of an exposure apparatus (an intermediate focal point 292). The EUV collector mirror 23 may have a through-hole 24 formed at the center thereof and a pulse laser beam 33 may travel through the through-hole 24.

The EUV light generation apparatus 1 may include an EUV light generation controller 5. Further, the EUV light generation apparatus 1 may include a target sensor 4. The target sensor 4 may detect at least one of the presence, trajectory, and position of a target. The target sensor 4 may have an imaging function.

Further, the EUV light generation apparatus 1 may include a connection part 29 for allowing the interior of the chamber 2 to be in communication with the interior of the exposure apparatus 6. A wall 291 having an aperture may be provided in the connection part 29. The wall 291 may be positioned such that the second focal point of the EUV collector mirror 23 lies in the aperture.

The EUV light generation apparatus 1 may also include a laser beam direction control unit 34, a laser beam focusing mirror 22, and a target collector 28 for collecting targets 27. The laser beam direction control unit 34 may include an optical element for defining the travelling direction of the laser beam and an actuator for adjusting the position or the attitude of the optical element.

3.2 Operation

With reference to FIG. 1, a pulse laser beam 31 outputted from the laser apparatus 3 may pass through the laser beam direction control unit 34 and, as the pulse laser beam 32, travel through the window 21 and enter the chamber 2. The pulse laser beam 32 may travel inside the chamber 2 along at least one beam path, be reflected by the laser beam focusing mirror 22, and strike at least one target 27 as a pulse laser beam 33.

The target supply device 26 may be configured to output the target(s) 27 toward the plasma generation region 25 in the chamber 2. The target 27 may be irradiated with at least one pulse of the pulse laser beam 33. Upon being irradiated with the pulse laser beam, the target 27 may be turned into plasma, and EUV light 251 may be generated from the plasma. The EUV light 251 may be reflected and focused by the EUV collector mirror 23. EUV light 252 reflected by the EUV collector mirror 23 may be outputted through the intermediate focal point 292 to the exposure apparatus 6. Here, the target 27 may be irradiated with multiple pulses included in the pulse laser beam 33.

The EUV light generation controller 5 may be configured to integrally control the EUV light generation system 11. The EUV light generation controller 5 may be configured to process image data of the target 27 captured by the target sensor 4. The EUV light generation controller 5 may be configured to control at least one of: the timing when the target 27 is outputted and the direction into which the target 27 is outputted, for example. The EUV light generation controller 5 may be configured to control at least one of: the timing when the laser apparatus 3 oscillates, the direction in which the pulse laser beam 32 travels, and the position at which the pulse laser beam 33 is focused. It will be appreciated that the various controls mentioned above are merely examples, and other controls may be added as necessary.

3. Details of EUV Light Generation System

Configuration

Figure 2:
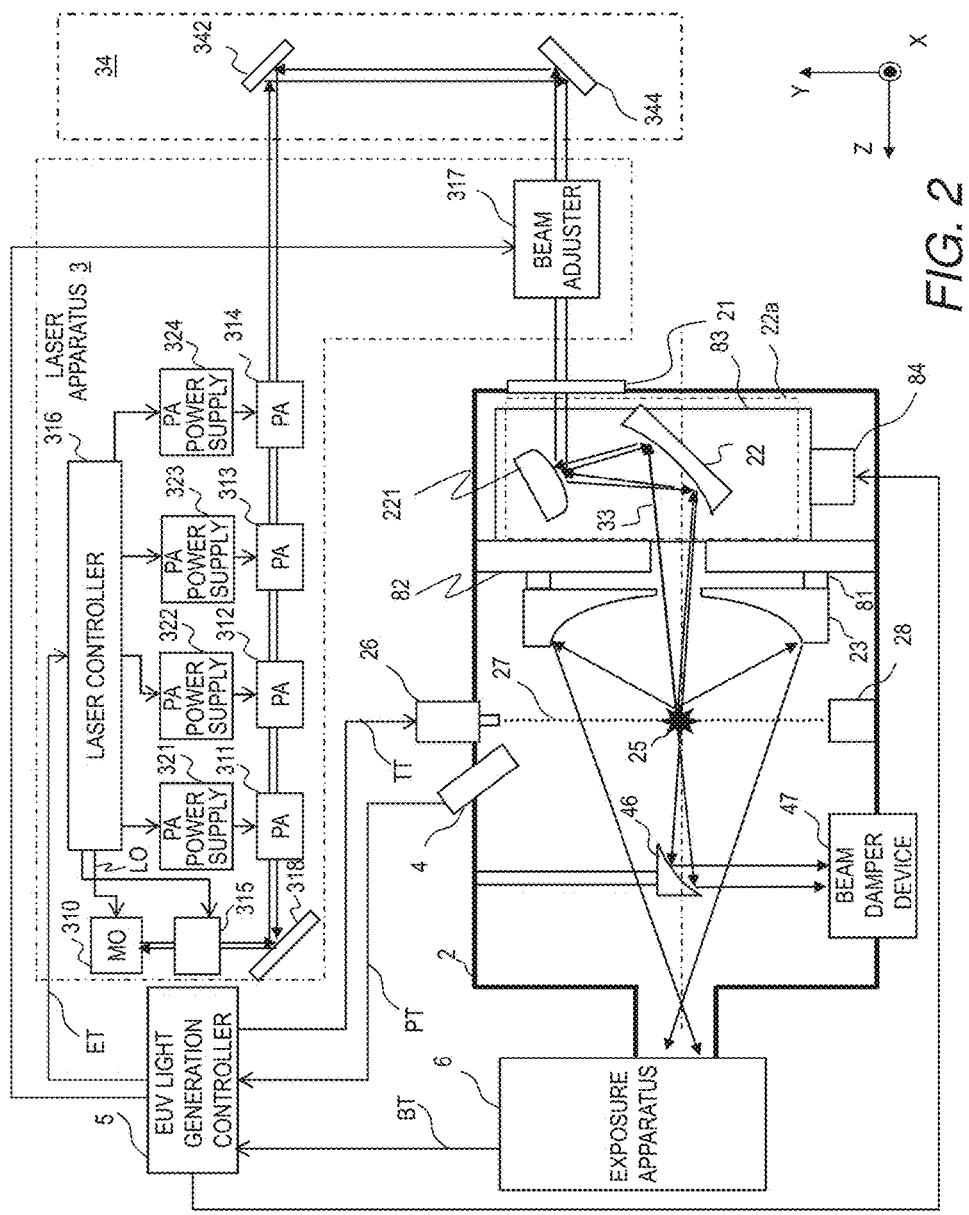
FIG. 2 illustrates details of a configuration example of an EUV light generation system.

FIG. 2 illustrates details of the configuration example of the EUV light generation system 11. As shown in FIG. 2, a laser beam focusing optical system 22a, an EUV collector mirror 23, a target collector 28, an EUV collector mirror holder 81, plates 82 and 83, a laser beam manipulator 84, and a damper mirror 46 may be provided within the chamber 2.

The plate 82 may be anchored to the chamber 2. The EUV collector mirror 23 may be anchored to the plate 82 with the EUV collector mirror holder 81. The laser beam focusing optical system 22a may include a convex mirror 221 and a laser beam focusing mirror 22. The positions and orientations of the convex mirror 221 and the laser beam focusing mirror 22 may be kept to focus the pulse laser beam 33 reflected by these mirrors at the plasma generation region 25. The target collector 28 may be disposed upon a straight line extending from the trajectory of the target 27.

The laser beam focusing optical system 22a may be provided on the plate 83. The plate 83 may be connected to the plate 82 with the laser beam manipulator 84. The plate 83 may be a movable plate. The laser beam manipulator 84 may be configured to be able to move the focal point of the pulse laser beam in the directions of the X-axis, the Y-axis, and the Z-axis to the point specified by the EUV light generation controller 5 by moving the plate 83 with respect to the plate 82.

The damper mirror 46 may be disposed on the laser beam path at the downstream of the plasma generation region 25 and configured to reflect the pulse laser beam that has passed through the plasma generation region 25 toward a beam damper device 47. The damper mirror 46 may collimate and reflect the incident pulse laser beam and may be an off-axis parabolic mirror. The damper mirror 46 may be equipped with a heater for heating its reflective surface to a temperature equal to or higher than the melting point of the target material.

The beam damper device 47 may be installed in the chamber 2. The beam damper device 47 may be disposed at a place to receive the pulse laser beam reflected by the damper mirror 46. The beam damper device 47 may have a damper window provided in the chamber 2 through which the pulse laser beam reflected by the damper mirror 46 will enter.

The target supply device 26 may be anchored to the chamber 2. The target supply device 26 may hold a target material in a melted state. A nozzle opening formed in the target supply device 26 may be positioned inside the chamber 2. The target supply device 26 may supply the melted target material to the plasma generation region 25 within the chamber 2 as droplet-shaped targets 27 through the nozzle opening. In the present disclosure, the targets 27 may also be referred to as droplets 27.

Outside the chamber 2, a laser apparatus 3, a laser beam direction control unit 34 of a laser beam delivery system, and an EUV light generation controller 5 may be provided. The laser apparatus 3 may include a master oscillator (MO) 310, multiple amplifiers (PA) 311 to 314, an optical isolator 315, a laser controller 316, and a beam adjuster 317. The laser apparatus 3 may further include a high-reflectance mirror 318 and not-shown optical elements on the laser beam path.

These optical elements may be configured to deliver and/or shape the laser beam. The master oscillator 310 and the amplifiers 311 to 314 may constitute a master oscillator power amplifier (MOPA). The amplifiers 311 to 314 may be disposed on the path of the laser beam outputted from the master oscillator 310.

The amplifiers 311 to 314 may be connected with PA power supplies 321 to 324. The PA power supplies 321 to 324 may be connected with the laser controller 316; the laser controller 316 may be connected with the EUV light generation controller 5.

The optical isolator 315 may be disposed on the laser beam path between the master oscillator 310 and the amplifier 311 and configured to transmit (in an opened state) or block (in a closed state) the laser beam in accordance with an instruction from the laser controller 316. The optical isolator 315 will be described later in detail with reference to FIGS. 14 and 15. The high-reflectance mirror 318 may be disposed on the laser beam path between the optical isolator 315 and the amplifier 311.

The beam adjuster 317 may be disposed on the laser beam path between the laser beam direction control unit 34 and the laser beam focusing optical system 22a and configured to adjust the divergence angle of the laser beam in accordance with an instruction from the laser controller 316. The beam adjuster 317 will be described later in detail with reference to FIGS. 16A to 16C.

The laser beam direction control unit 34 may direct the pulse laser beam outputted by the laser apparatus 3 to the laser beam focusing optical system 22a via the window 21. The laser beam direction control unit 34 may include a high reflectance mirror 342 and a high reflectance mirror 344.

The EUV light generation controller 5 may receive a control signal from the exposure apparatus 6. The EUV light generation controller 5 may control the target supply device 26, the laser apparatus 3, and the laser beam manipulator 84 in accordance with the control signal from the exposure apparatus 6.

Operation

The target supply device 26 may supply droplet-shaped targets 27 to the plasma generation region 25 at a predetermined velocity and a predetermined frequency, in accordance with a target output signal TT from the EUV light generation controller 5. For example, the target supply device 26 may produce droplets at a predetermined frequency within a range of several 10 kHz to several 100 kHz.

A target sensor 4 may detect a target 27 passing through a specific region. The target sensor 4 may output a passage timing signal PT as a detection signal of a target 27 to the EUV light generation controller 5.

The EUV light generation controller 5 may receive a burst signal BT from the exposure apparatus 6. The burst signal BT may be a signal for instructing the EUV light generation system 11 to generate EUV light within a specified period. The EUV light generation controller 5 may perform control to output EUV light to the exposure apparatus 6 during the specified period.

In the period where the burst signal BT is ON, the EUV light generation controller 5 may control the laser apparatus 3 to output a pulse laser beam in accordance with the passage timing signal PT. In the period where the burst signal BT is OFF, the EUV light generation controller 5 may control the laser apparatus 3 not to output a pulse laser beam.

For example, the EUV light generation controller 5 may output the burst signal BT received from the exposure apparatus 6 and a light emission trigger signal ET delayed by a predetermined time from the passage timing signal PT to the laser apparatus 3. When the burst signal BT is ON, the laser apparatus 3 may output a pulse laser beam in response to a pulse of the light emission trigger signal ET.

The laser controller 316 may output a laser output signal LO to the master oscillator 310 in response to receipt of the light emission trigger signal ET. Before this operation, the laser controller 316 may turn on the PA power supplies 321 to 324. As a result, the PA power supplies 321 to 324 may supply voltage or current to the internal electrodes of the corresponding amplifiers 311 to 314 to make the amplifiers 311 to 314 ready for amplification.

The master oscillator 310 may output a pulse laser beam synchronously with the laser output signal LO. The laser controller 316 may open the optical isolator 315 synchronously with the laser output signal LO. The outputted pulse laser beam may be amplified by the amplifiers 311 to 314, travel through the laser beam direction control unit 34, and enter the beam adjuster 317. The beam adjuster 317 may adjust the divergence angle of the received pulse laser beam and output the laser beam. The pulse laser beam outputted from the beam adjuster 317 may travel through the window 21 and enter the chamber 2. The power of the pulse laser beam outputted from the laser apparatus 3 may reach several kilowatts to several ten kilowatts.

The EUV light generation controller 5 may adjust the outgoing position of the pulse laser beam with the laser beam manipulator 84. The EUV light generation controller 5 may change the delay time of the light emission trigger signal ET from the passage timing signal PT.

The pulse laser beam may be focused by the laser beam focusing optical system 22a to hit a target 27 that has arrived at the plasma generation region 25 and generate EUV light. The diameter of the pulse laser beam to hit a target 27 may be larger than the diameter of the target 27; a part of the pulse laser beam may miss the target 27 and hit the damper mirror 46.

The pulse laser beam reflected by the damper mirror 46 may be absorbed by the beam damper device 47 and converted to heat. The generated heat may be discharged to the external by a not-shown cooling device.

The emitted pulse laser beam may not hit a target 27. For example, the laser apparatus 3 may keep outputting a pulse laser beam to stabilize the power or to adjust the beam path but intentionally avoid irradiation by suspending output of a target 27 or changing the delay time. In such a case, the pulse laser beam may maintain the power and hit the damper mirror 46 without hitting a target 27.

Issues

Figure 3:
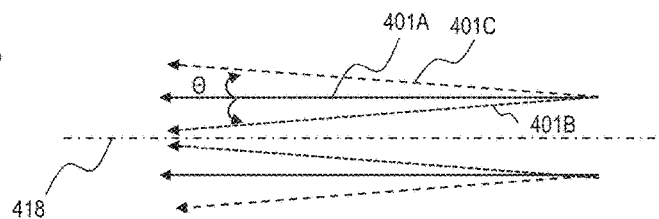
FIG. 3 illustrates the definition of divergence angle.

FIG. 3 illustrates the definition of divergence angle. In FIG. 3, the pulse laser beam 401A traveling in parallel to the laser beam axis 418 is defined as collimated beam having a divergence angle $\theta=0$. The pulse laser beam 401C traveling in a direction expanding from the laser beam axis 418 is defined as pulse laser beam having a positive divergence angle. The pulse laser beam 401B traveling in a direction converging toward the laser beam axis 418 is defined as pulse laser beam having a negative divergence angle. The divergence angle $\theta$ is defined by the half angle.

Figure 4A:
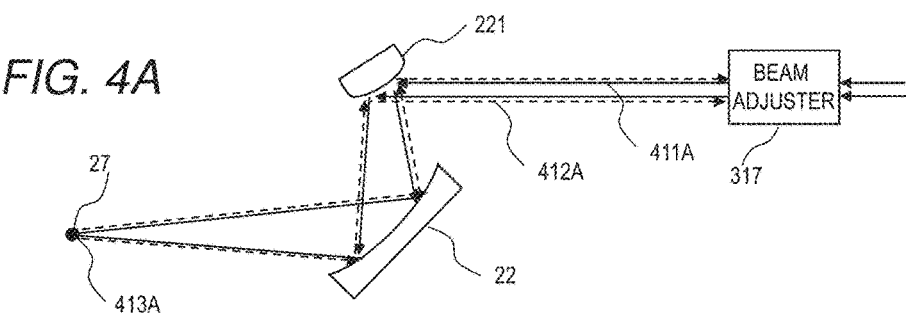
FIG. 4A illustrates a state of a return beam in the case where the focal point of the pulse laser beam is set to the target position.
Figure 4B:
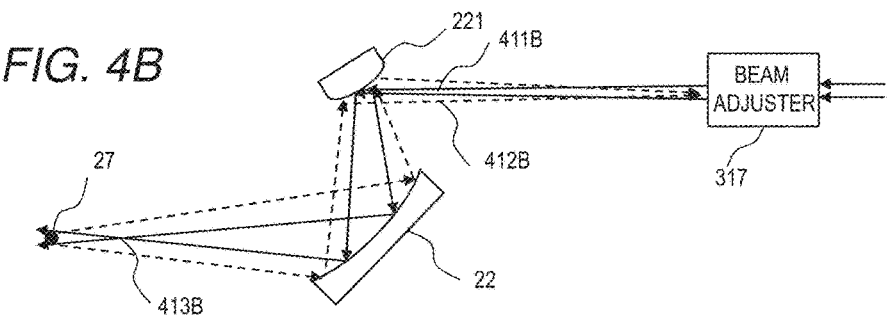
FIG. 4B illustrates a state of a return beam in the case where the focal point of the pulse laser beam is set to a position upstream of the target position.
Figure 4C:
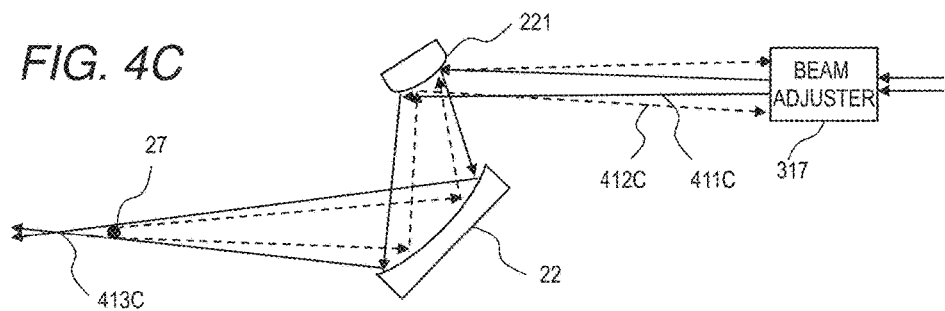
FIG. 4C illustrates a state of a return beam in the case where the focal point of the pulse laser beam is set to a position downstream of the target position.

FIGS. 4A to 4C illustrate states of the return beam depending on the focused state of the pulse laser beam when hitting a target 27. The arrowed solid lines in FIGS. 4A to 4C represent a pulse laser beam to hit a target 27 and the arrowed broken lines represent a return beam. The pulse laser beam entering the beam adjuster 317 is assumed to be a collimated beam.

FIG. 4A illustrates a state of the return beam in the case where the focal point 413A of the pulse laser beam is set to the target position. The state where the focal point 413A of the pulse laser beam is located at the target position is referred to as best focused state. The pulse laser beam 411A outputted from the beam adjuster 317 may be a collimated beam. The target 27 before turning into plasma may reflect the pulse laser beam by surface reflection. The pulse laser beam reflected off the target 27 may become a return beam.

In the case where the focal point of the pulse laser beam is set to the target position, the return beam may travel back almost along the optical path of the pulse laser beam to hit a target 27. The return beam 412A entering the beam adjuster 317 may be a collimated beam. Furthermore, the return beam may hit and damage the optical elements defining the upstream optical path of the pulse laser beam. Particularly in the case where the laser apparatus 3 is configured as an MOPA including a master oscillator (MO)

310 and multiple amplifiers (PA) 311 to 314, optical elements provided in a more upstream region may have lower laser resistance. In this case, the return beam, which is a part of an amplified high-power laser beam, may damage the optical elements having low laser resistance.

FIG. 4B illustrates a state of the return beam in the case where the focal point 413B of the pulse laser beam is set to a position upstream of the target position. The state where the focal point 413B of the pulse laser beam is located at a position upstream of the target position is referred to as anteriorly focused state. The pulse laser beam 411B outputted from the beam adjuster 317 may be a pulse laser beam having a negative divergence angle. The target 27 before turning into plasma may reflect the pulse laser beam by surface reflection. The pulse laser beam reflected off the target 27 may become a return beam.

The return beam 412B to enter the beam adjuster 317 may be a pulse laser beam having a negative divergence angle. The return beam having a negative divergence angle may be focused in the middle of the upstream path of the pulse laser beam. For example, if the return beam is focused in the vicinity of the surface of an optical element of the laser beam direction control unit 34, the return beam 412B may damage the optical element. Even if the return beam 412B is focused in a space other than the surface of an optical element, the return beam 412B may diverge to heat a not-shown holder holding an optical element. The thermal deformation of the heated holder may cause misalignment of the optical element (in tilt or position).

Figure 5A:
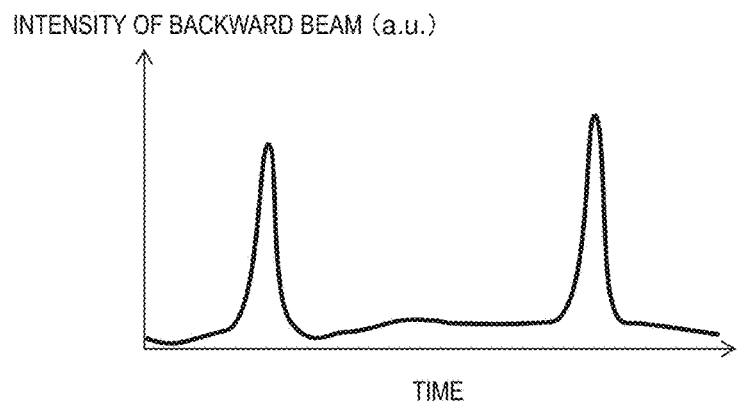
FIG. 5A schematically illustrates a temporal waveform of a return beam.

In the states of FIGS. 4A and 4B, the return beam may travel back along the laser beam path from the laser beam focusing optical system 22a to the master oscillator 310. FIG. 5A schematically illustrates a temporal waveform of a return beam. The return beam is a pulse beam and the temporal waveform of the return beam may have peaks synchronous with laser irradiation of a target.

FIG. 4C illustrates a state of the return beam in the case where the focal point 413C of the pulse laser beam is set to a position downstream of the target position. The state where the focal point 413C of the pulse laser beam is located at a position downstream of the target position is referred to as defocused state. The pulse laser beam 411C outputted from the beam adjuster 317 may be a pulse laser beam having a positive divergence angle. The target 27 before turning into plasma may reflect the pulse laser beam by surface reflection. The pulse laser beam reflected off the target 27 may become a return beam.

The return beam 412C to enter the beam adjuster 317 may be a pulse laser beam having a positive divergence angle. The return beam having a positive divergence angle may expand and travel back along the optical path of the pulse laser beam; the energy density thereof may be reduced during the travel. Accordingly, the possibility that the optical elements defining the upstream laser beam path could be damaged may be very low.

As described above, depending on the relation between the target position and the focal point of the pulse laser beam, the return beam may cause damage or misalignment of an optical element.

Meanwhile, in the case where the laser apparatus 3 includes multiple amplifiers 311 to 314, a self-oscillation beam may be generated. The self-oscillation beam is generated when an amplified spontaneous emission (ASE) beam outputted from an optical amplifier in an amplifiable state is amplified by another optical amplifier in an amplifiable state.

Usually, the laser apparatus 3 may be designed and adjusted not to generate a self-oscillation beam. However, if an optical element has damage or a foreign substance on the optical surface, the reflection off these may be amplified by another amplifier to become a self-oscillation beam. The self-oscillation beam may be generated when the alignment of an optical element on the laser beam path is changed after the initial adjustment.

Figure 5B:
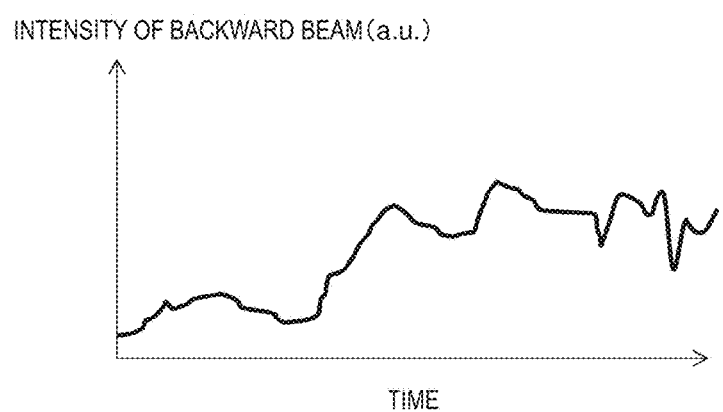
FIG. 5B schematically illustrates a temporal waveform of a self-oscillation beam.

A self-oscillation beam may travel toward the master oscillator and/or the target. The self-oscillation beam may become an unexpected focused state on the laser beam path and damage the optical element at the focal point. FIG. 5B schematically illustrates a temporal waveform of a self-oscillation beam. The temporal waveform of a self-oscillation beam is an irregular waveform in which a peak caused by a specific phenomenon cannot be identified. Compared to the pulse waveform of a return beam, the waveform of a self-oscillation beam may be a lasting waveform.

As described above, the self-oscillation beam may be generated because of damage or misalignment of an optical element. When a self-oscillation beam is generated, the optical elements may be damaged more severely. Accordingly, the laser apparatus 3 may get serious damage. As described above, the damage and misalignment of an optical element may be caused by a return beam. Accordingly, the return beam may induce a self-oscillation beam to cause serious damage of the laser apparatus 3.

The laser apparatus 3 may be requested to output the pulse laser beam at higher power. The laser apparatus 3 may be aligned to the state of FIG. 4C at the initial adjustment. However, as the heat input to optical elements increases with increase in power of the pulse laser beam, the optical elements may be thermally deformed to have thermal lens effect, which may change the alignment to the state of FIG. 4A or 4B. As a result, a return beam may be generated. Further, the return beam of the high-power pulse laser beam has also high power; the optical elements on the laser beam path may easily become damaged.

To increase the power of the pulse laser beam, higher-gain amplifiers may be used to raise the amplification rate. The high-gain amplifiers may increase ASE to cause self-oscillation more frequently. For this reason, when the power of the pulse laser beam is increased, the optical elements may get damaged by a return beam or self-oscillation beam, so that the laser apparatus 3 may easily get failed or impaired in performance.

4. Embodiment 1

Configuration

Figure 6:
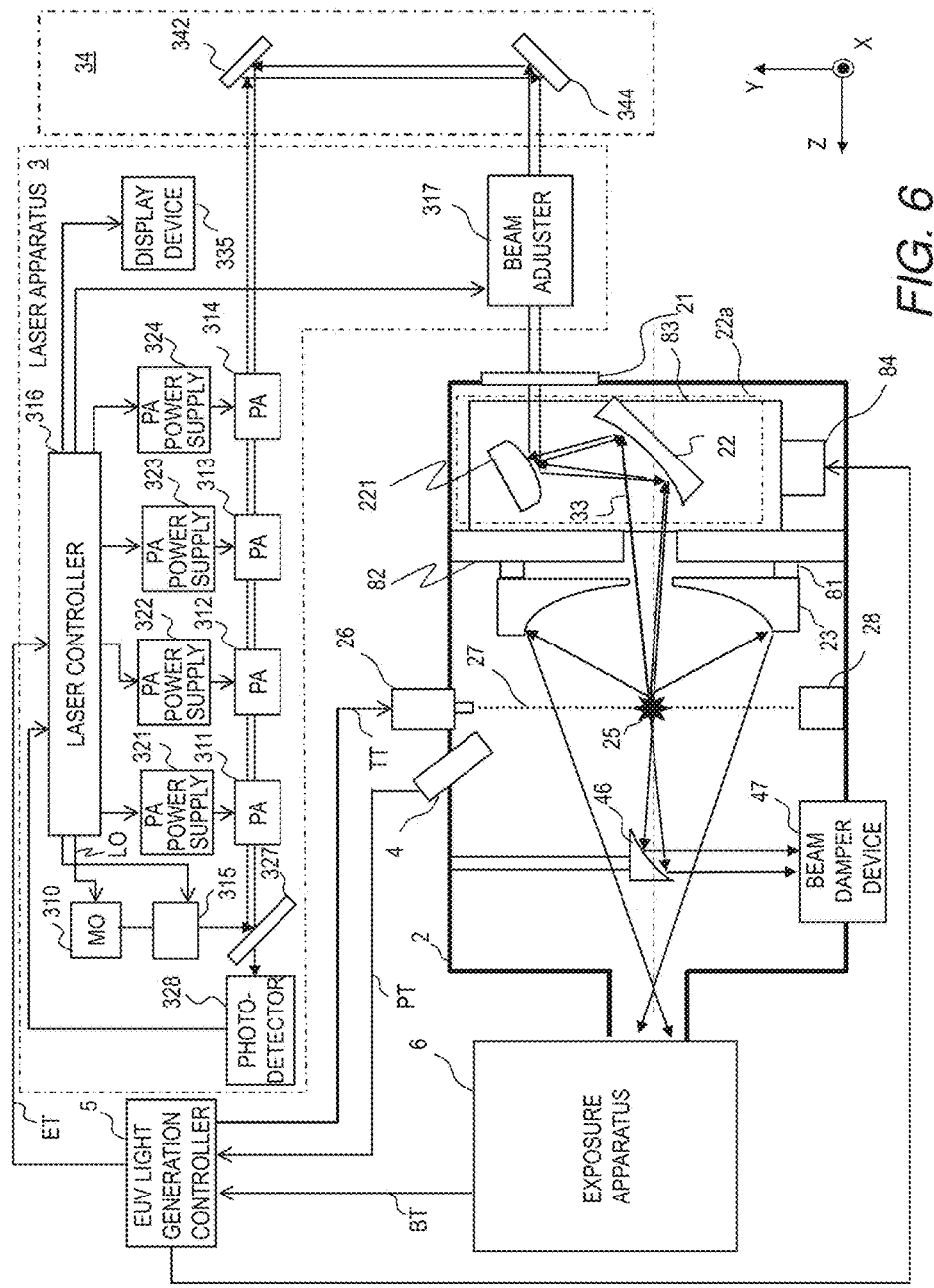
FIG. 6 illustrates a configuration example of an EUV light generation system in Embodiment 1.

With reference to FIG. 6, a configuration of an EUV light generation system 11 in Embodiment 1 is described. The differences from the configuration in FIG. 2 are mainly described. The laser apparatus 3 may include a beam splitter 327, a photodetector 328, and a display device 335.

The beam splitter 237 may replace the high-reflectance mirror 318. The beam splitter 327 may be configured to reflect a part of the incident beam and transmit the remaining of the incident beam. The photodetector 328 may be disposed to receive the beam that travels back along the laser beam path and passes through the beam splitter 327. In the present embodiment, the photodetector device to detect a beam traveling back along the laser beam path may be configured with a single photodetector 328.

The beam traveling back along the laser beam path may include a return beam and a self-oscillation beam. A not-shown optical system may be provided between the beam splitter 327 and the photodetector 328. The optical system may be a collimating optical system or a focusing optical system. The photodetector 328 may output a temporal waveform of the beam traveling back along the laser beam path to the laser controller 316. The temporal waveform of the beam traveling back along the laser beam path may be called a detection signal.

The photodetector 328 to receive a beam split by the beam splitter 327 disposed between the master oscillator 310 and the amplifier 311 may detect a return beam and a self-oscillation beam from any of the amplifiers 311 to 314. The beam splitter 327 may be provided at a different position on the laser beam path.

The display device 335 may show the information sent from the laser controller 316 to the operator. The display device 335 may include a monitor and may be a computer including a monitor. The beam adjuster 317 may be connected with and controlled by the laser controller 316.

Operation

The beam splitter 327 may reflect the pulse laser beam received from the master oscillator 310 via the optical isolator 315 toward the amplifier 311. The beam splitter 327 may transmit the beam traveling back along the laser beam path and direct the beam to the photodetector 328. The beam splitter 327 may be configured to extract a part of the beam traveling back along the laser beam path and direct it to the photodetector 328.

The laser controller 316 may receive a detection signal from the photodetector 328. The laser controller 316 may determine whether the beam traveling back along the laser beam path includes a return beam or self-oscillation beam harmful for optical elements, that is, whether a return beam or self-oscillation beam is present, based on the detection signal outputted by the photodetector 328. The laser controller 316 may determine whether a return beam or self-oscillation beam is present based on the temporal variation in intensity of the detection signal. The photodetector 328 may output a detection signal in accordance with the energy or power of the received light, for example. The detection signal may be in voltage, for example.

The laser controller 316 may determine that a self-oscillation beam is generated when detecting a waveform of the detection signal in which the time showing values higher than a threshold lasts long. Furthermore, the laser controller 316 may determine that a return beam is generated when detecting a waveform of the detection signal showing pulses at values higher than the threshold.

Figure 7:
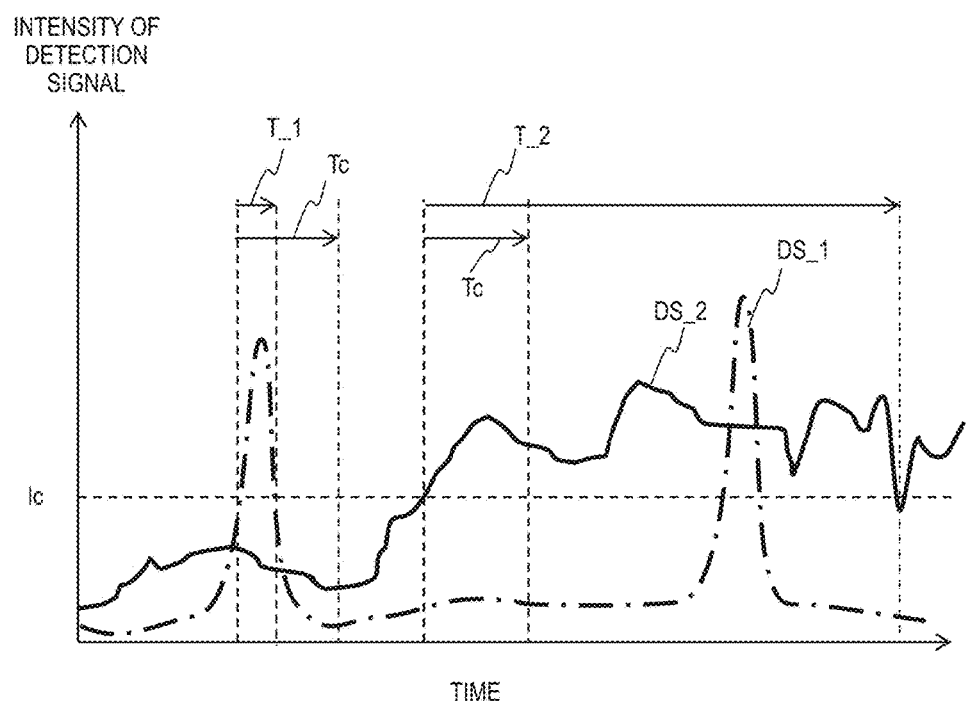
FIG. 7 is a graph for illustrating an example of a way for a laser controller to determine whether a return beam or self-oscillation beam is present in Embodiment 1.

FIG. 7 is a graph for illustrating an example of a way for the laser controller 316 to determine whether a return beam or self-oscillation beam is present. FIG. 7 shows two different detection signals DS_1 and DS_2 of the photodetector 328. The detection signal DS_1 is an example of a detection signal of a return beam. The detection signal DS_2 is an example of a detection signal of a self-oscillation beam. The laser controller 316 may be provided with a threshold Ic for the intensity of the detection signal. Furthermore, the laser controller 316 may be provided with a threshold Tc for the time.

As to the detection signal DS_1, the signal intensity is higher than the intensity threshold Ic for the time T_1. As to the detection signal DS_2, the signal intensity is higher than the intensity threshold Ic for the time T_2. The time T_1 is shorter than the time threshold Tc and the time T_2 is longer than the time threshold Tc.

The laser controller 316 may measure the time T for which the intensity of the detection signal is higher than the intensity threshold Ic and compare the time T with the time threshold Tc to determine whether a return beam or self-oscillation beam is present. If the time T is longer than the time threshold Tc, the laser controller 316 may determine that a self-oscillation beam is generated. If the time T is shorter than the time threshold Tc, the laser controller 316 may determine that a return beam is generated.

Figure 8:
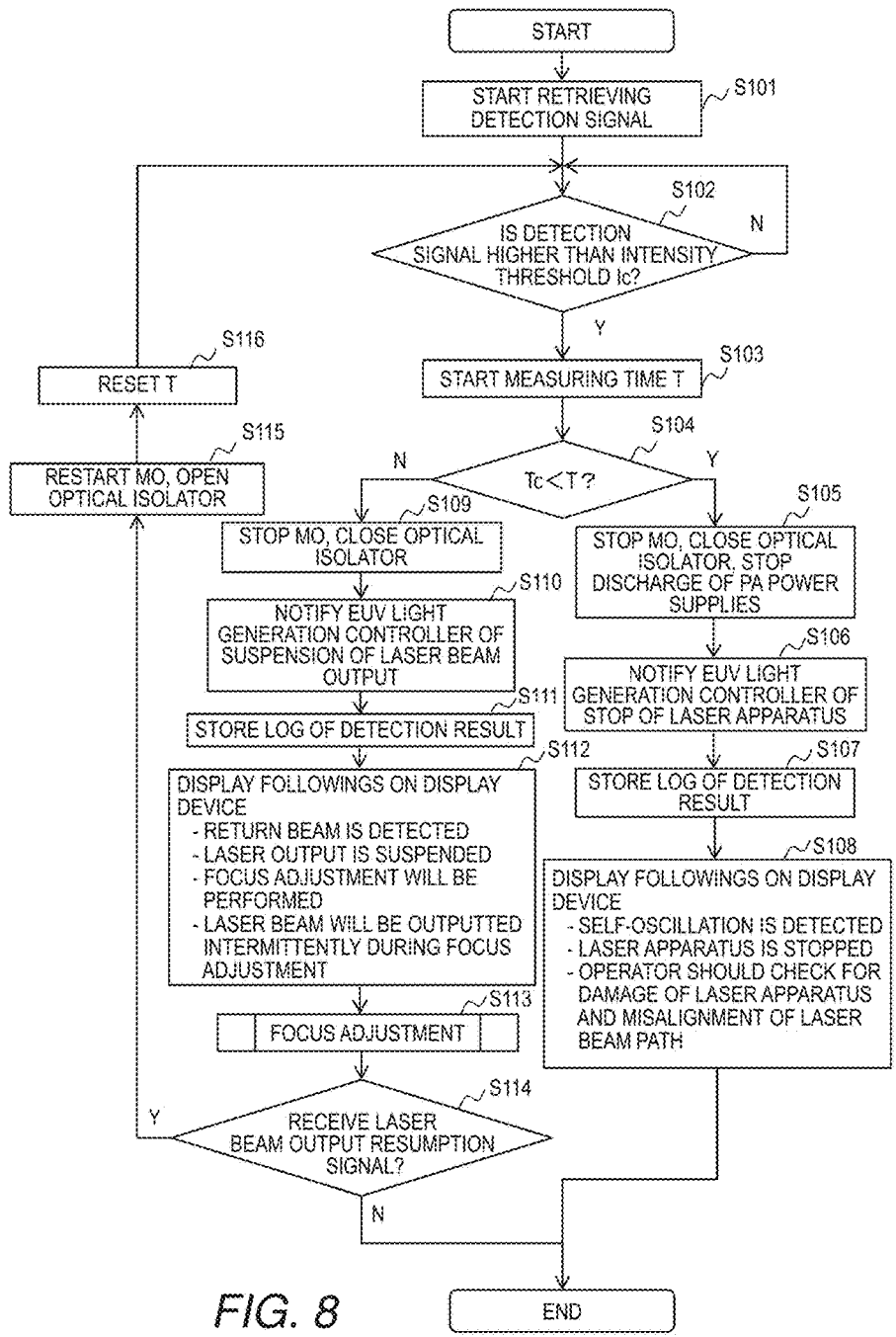
FIG. 8 is a flowchart of operation of the laser controller to detect and address a return beam or self-oscillation beam in Embodiment 1.

FIG. 8 is a flowchart of operation of the laser controller 316 to detect and address a return beam or self-oscillation beam. The laser controller 316 may start retrieving the detection signal outputted by the photodetector 328 (S101).

The laser controller 316 may determine whether the detection signal is higher than the intensity threshold Ic (S102). The intensity threshold Ic may be predetermined based on the threshold for damage of the optical elements included in the laser apparatus 3. The laser controller 316 may have different intensity thresholds Ic depending on the operating conditions of the laser apparatus 3 (such as the output energy, the cycle, and the duty). If the detection signal is higher than the intensity threshold Ic (S102: Y), the laser controller 316 may start measuring the time T in which the intensity of the detection signal is higher than the intensity threshold Ic (S103). If the intensity of the detection signal is equal to or lower than the intensity threshold Ic (S102: N), the laser controller 316 may perform S102 again.

The laser controller 316 may determine whether the time T has exceeded the time threshold Tc (S104). The laser controller 316 may compare the time T with the time threshold Tc to determine which of the return beam and the self-oscillation beam is detected. If the time T has exceeded the time threshold Tc, the laser controller 316 may determine that a self-oscillation beam has been detected. If the time T is equal to or shorter than the time threshold Tc, the laser controller 316 may determine that a return beam has been detected.

The laser controller 316 may choose the subsequent processing depending on which of a return beam and a self-oscillation beam has been detected. Specifically, in the case where a self-oscillation beam has been detected (S104: Y), the laser controller 316 may stop the laser apparatus 3 and then, store the log of the detection result, provide information to the operator through the display device 335, and terminate the processing.

Specifically, the laser controller 316 may stop the master oscillator 310, close the optical isolator 315, and further, stop the PA power supplies 321 to 324 from discharging electricity to the amplifiers 311 to 314 (S105). The laser controller 316 may further notify the EUV light generation controller 5 of the stop of the laser apparatus 3 (S106). The EUV light generation controller 5 may notify the exposure apparatus 6 of the stop of the laser apparatus 3.

The laser controller 316 may output a result of detection of a self-oscillation beam to a log table and store the log table (S107). The log table may store the operation log of the laser controller 316 with the time and date. The log table may be stored in a storage memory 1005, which will be described later with reference to FIG. 17. The laser controller 316 may store the information of the stop of the laser apparatus 3 to the log table.

The laser controller 316 may output the following information to the display device 335 (S108): (1) that a self-oscillation beam has been detected; (2) that the laser apparatus 3 has been stopped; and (3) that the operator needs to check the laser apparatus 3 for damage and the laser beam path for misalignment. The display device 335 may display information on these matters.

This display may enable the operator to have a chance to check the laser apparatus 3 for damage and the laser beam path for misalignment. The thresholds Ic and Tc may be stored in advance in the storage memory 1005 of the laser controller 316 by communication via a network, connection of a storage medium, or input through a console.

If a return beam is detected (S104: N), the laser controller 316 may suspend the output of the laser beam, store the log of the detection result, and provide information to the operator through the display device 335, and thereafter, adjust the focus.

Specifically, the laser controller 316 may stop the master oscillator 310 and close the optical isolator 315 (S109). The laser controller 316 may keep operating the amplifiers 311 to 314 without stopping the electricity from the PA power supplies 321 to 324. This may reduce the time for the later-described focus adjustment S113. The electricity from the PA power supplies 321 to 324 may be stopped.

The laser controller 316 may further notify the EUV light generation controller 5 of the suspension of the output of the laser beam (S110). The EUV light generation controller 5 may notify the exposure apparatus 6 of the suspension of the output of the laser beam. The laser controller 316 may output a result of detection of a return beam to the log table and store the log table (S111). The laser controller 316 may store the information of the suspension of the output of the laser beam to the log table.

The laser controller 316 may output the following information to the display device 335 (S112): (1) that a return beam has been detected; (2) that the laser output has been suspended; (3) that focus adjustment will be performed; and (4) that a laser beam will be intermittently outputted during the focus adjustment. The display device 335 may display the information on these matters.

The laser controller 316 may perform focus adjustment (S113). The details of the focus adjustment S113 will be described later with reference to FIG. 9.

Upon receipt of a laser beam output resumption signal sent from the EUV light generation controller 5 during or after the focus adjustment (S114: Y), the laser controller 316 may resume outputting a laser beam (S115). If the laser controller 316 does not receive the laser beam output resumption signal (S114: N), the laser controller 316 may terminate this processing.

Figure 9:
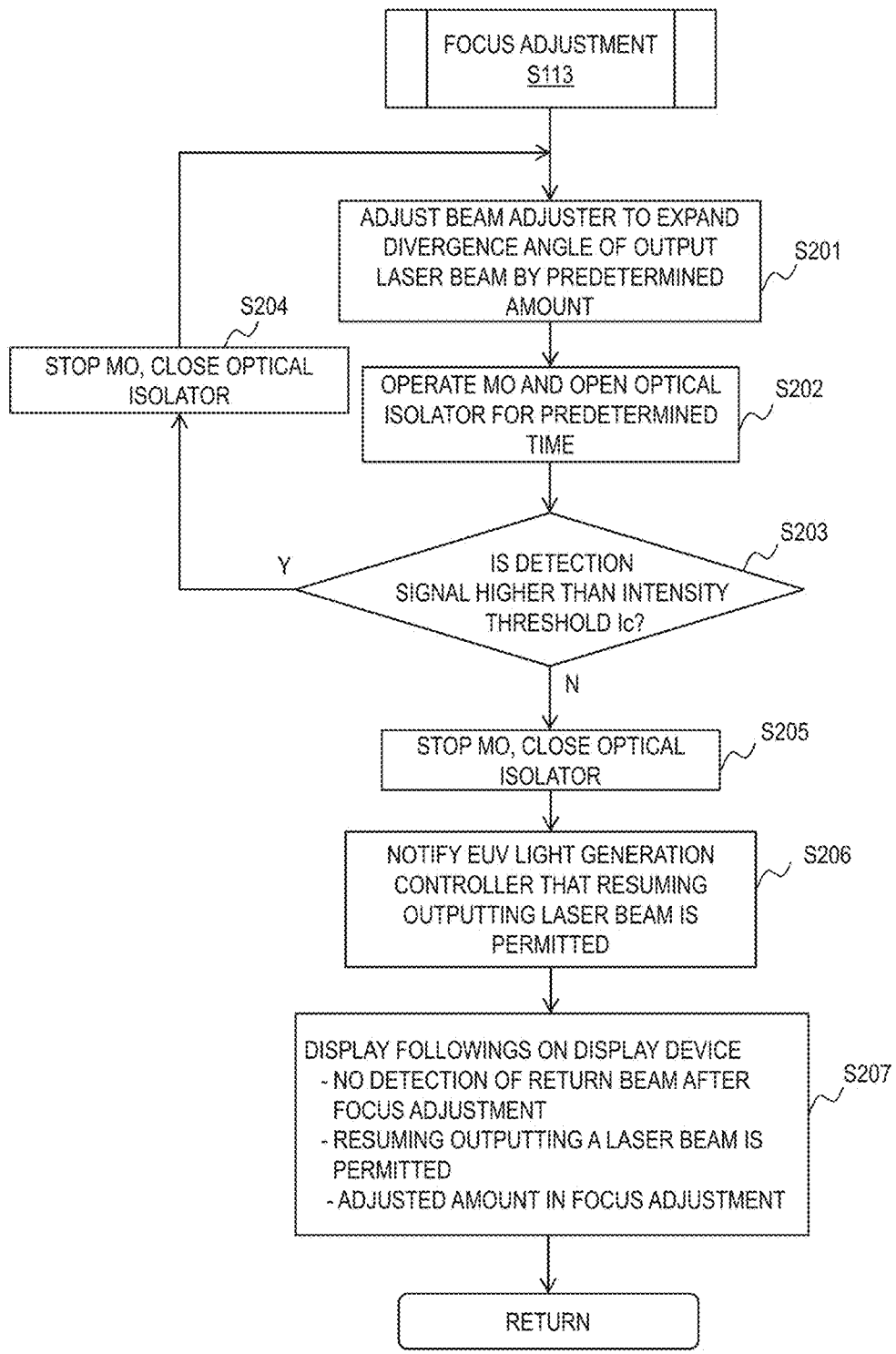
FIG. 9 is a detailed flowchart of focus adjustment in Embodiment 1.

FIG. 9 is a detailed flowchart of the focus adjustment S113. The laser controller 316 may repeat operation to expand the divergence angle of the laser beam by a predetermined amount until the return beam is not detected. The predetermined amount may be a value determined by experiment.

Specifically, the laser controller 316 may adjust the beam adjuster 317 so that the divergence angle of the laser beam outputted from the beam adjuster 317 increases by a predetermined amount (S201). Further, the laser controller 316 may make the master oscillator 310 output a pulse laser beam and open the optical isolator 315 for a predetermined time (S202). The predetermined time may be a time sufficiently longer than the time threshold Tc and determined by experiment.

The laser controller 316 may receive a detection signal from the photodetector 328 and determine whether the intensity of the detection signal is higher than the intensity threshold Ic (S203). If determining that the intensity of the detection signal is higher than the intensity threshold Ic (S203: Y), the laser controller 316 may stop the master oscillator 310, close the optical isolator 315 (S204), and return to Step S201.

If determining at Step S203 that the intensity of the detection signal is not higher than the intensity threshold Ic (S203: N), the laser controller 316 may stop the master oscillator 310 and close the optical isolator 315 (S205). Further, the laser controller 316 may notify the EUV light generation controller 5 that resuming outputting a laser beam is permitted (S206). The EUV light generation controller 5 may notify the exposure apparatus 6 that resuming outputting a laser beam is permitted.

The laser controller 316 may output the following information to the display device 335 (S207): (1) that the return beam is not detected because of the focus adjustment; (2) that resuming outputting a laser beam is permitted; and (3) the adjusted amount in the focus adjustment. The display device 335 may display information on these matters. The laser controller 316 may store the result of the focus adjustment to the log table.

Effects

The present embodiment may correctly determine whether a beam traveling back along the laser beam path is a return beam or self-oscillation beam that could damage optical elements, using a detection signal of one photodetector. Since the present embodiment may determine whether the beam traveling back along the laser beam path is light that could damage optical elements and appropriately address the problem, the damage of the optical elements may be prevented. In the case of determining that the beam traveling back along the laser beam path is a return beam, the present embodiment may perform focus adjustment to reduce the return beam. Accordingly, even if the thermal lens effect of an optical element is heightened with increase in power of the laser beam, the damage of the optical element may be prevented.

In the case of determining that the beam traveling back along the laser beam path is a self-oscillation beam, the present embodiment may immediately stop the laser apparatus 3. Then, the operator may get a chance to check the optical elements for damage or misalignment.

When the gain of the amplifiers is raised with increase in power of the laser beam, slight damage of an optical element caused by a return beam may increase the frequency of generation of a self-oscillation beam. The present embodiment may detect a self-oscillation beam distinguishingly from a return beam to detect damage of an optical element at an earlier stage when the power of the laser beam is increased. The foregoing configuration may prevent optical elements from being damaged by a return beam or self-oscillation beam caused by increase in power of the pulse laser beam outputted from the laser apparatus 3, achieving stable operation of the laser apparatus 3.

The laser controller 316 may use different intensity thresholds and/or different time thresholds for detecting a return beam and a self-oscillation beam. For example, the intensity threshold for detecting a self-oscillation beam may be smaller than the intensity threshold for detecting a return beam. The time threshold for detecting a self-oscillation beam may be longer than the time threshold for detecting a return beam.

The photodetector device for detecting a beam traveling back along the laser beam path may include photodetectors of the same type but different in gain. The laser controller 316 may receive detection signals from the photodetectors of the same type but different in gain to detect a return beam with the detection signal of one photodetector and detect a self-oscillation beam with the detection signal of the other photodetector. The laser apparatus 3 described in the present embodiment may be applicable to a system different from the EUV light generation system 11. For example, the laser apparatus 3 may be applicable to a laser annealing apparatus or a laser processing apparatus. The same applies to Embodiment 2.

5. Embodiment 2

Configuration

Figure 10:
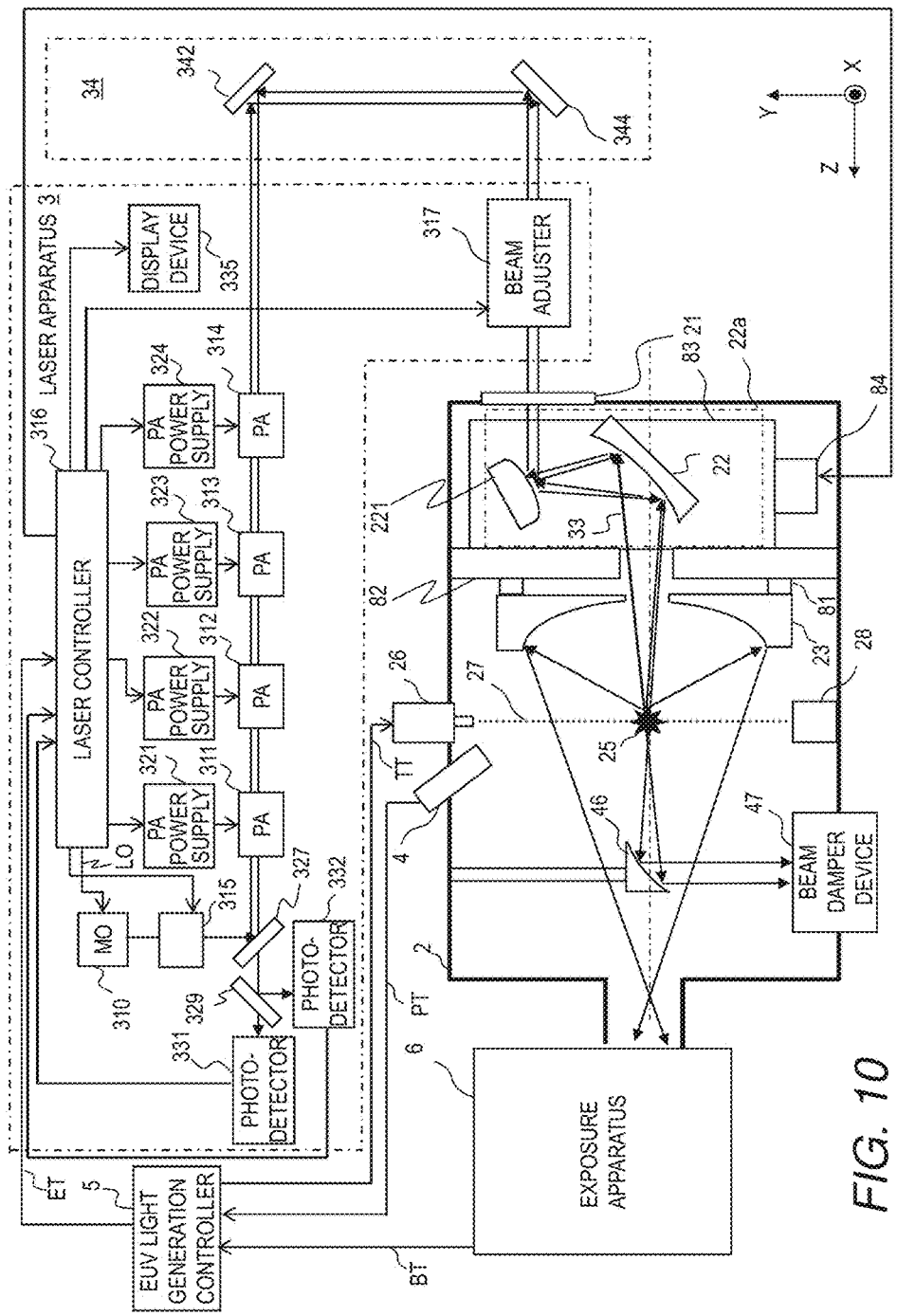
FIG. 10 illustrates a configuration example of an EUV light generation system in Embodiment 2.

A configuration of an EUV light generation system 11 in Embodiment 2 is described with reference to FIG. 10. The differences from the configuration in FIG. 6 are mainly described. The laser apparatus 3 may include beam splitters 327 and 329, and photodetectors 331 and 332. The photodetectors 331 and 332 may be connected with and controlled by the laser controller 316.

The laser beam manipulator 84 may be connected with and controlled by the laser controller 316. The laser beam manipulator 84 may be a three-axis stage. The laser beam manipulator 84 may move the laser beam focusing optical system 22a along the X-axis, the Y-axis, and the Z-axis in accordance with an instruction from the laser controller 316.

The beam splitter 329 may be configured to transmit a part of the beam transmitted by the beam splitter 327 toward the photodetector 331 and reflect the remaining part toward the photodetector 332. The reflectance of the beam splitter 329 may be larger than 50%. In the present embodiment, the photodetector device for detecting a beam traveling back along the laser beam path may be configured with the two photodetectors 331 and 332. The photodetectors 331 and 332 may receive the light extracted at different positions on the laser beam path. For example, the light to be received by the photodetector 332 may be extracted at a position downstream of the position where the light on the laser beam path is split for the photodetector 331 to receive.

The photodetector 331 may be an energy sensor. The photodetector 331 may output a detection signal 1 representing the pulse energy of the beam traveling back along the laser beam path to the laser controller 316. For example, the photodetector 331 may be a photovoltaic sensor or a mercury cadmium telluride (MCT) sensor. The photovoltaic sensor is a sensor that makes electrons in the sensor element absorb optical energy to convert the optical energy directly to electric energy by photovoltaic effect. The MCT sensor is a sensor in which the resistance decreases in response to receiving infrared light.

The photovoltaic sensor or MCT sensor may output a voltage or current value representing the pulse energy of the incident beam. The pulse energy may be expressed as the value (J) obtained by dividing the peak power by the pulse width. The photovoltaic sensor or MCT sensor has high responsivity and may be able to detect a return beam that enters the sensor in the form of a pulse beam in a relatively short time at each pulse. The response speed may be several nanoseconds or less.

The photovoltaic sensor or MCT sensor shows large variation in sensitivity behavior to variation in temperature of the sensor; the variation in sensitivity behavior may be 3%/deg or less. Accordingly, the photovoltaic sensor or MCT sensor may detect a return beam of a pulse beam more accurately than a self-oscillation beam that yields relatively large variation in heat input to the sensor.

The photodetector 332 may be a power meter. The power meter may have responsivity lower than the energy sensor. The photodetector 332 may output a detection signal 2 representing the power of the beam traveling back along the laser beam path to the laser controller 316. The photodetector 332 may be a thermopile sensor. The thermopile sensor is a sensor in which junctions of a large number of thermocouples connected in series are gathered and is operated by thermoelectric power.

The thermopile sensor may output a voltage or current value representing the power of the incident beam. The power of the incident beam may be expressed as the average power (W) per unit time. The thermopile sensor has low responsivity and the response time may be several ten milliseconds. For this reason, the thermopile sensor may detect a self-oscillation beam more accurately than a return beam entering in the form of a pulse beam in a relatively short time.

The thermopile sensor shows very small variation in sensitivity behavior to variation in temperature of the sensor; the variation in sensitivity behavior may be approximately 0.1%/deg. Accordingly, the thermopile sensor may detect a self-oscillation beam that yields relatively large variation in heat input to the sensor, with relatively high accuracy.

Operation

The beam splitter 327 may reflect the pulse laser beam received from the master oscillator 310 via the optical isolator 315 toward the amplifier 311. The beam splitter 327 may transmit the beam traveling back along the laser beam path and direct the beam to the beam splitter 329.

The beam splitter 329 may direct the beam transmitted by the beam splitter 327 to the photodetectors 331 and 332. If the reflectance of the beam splitter 327 is configured to be higher than 50%, the amount of incident light on the photodetector 332 of a power meter may be larger than the amount of incident light on the photodetector 331 of an energy sensor. The photodetectors 331 and 332 may respectively output detection signals 1 and 2 to the laser controller 316.

Figure 11A:
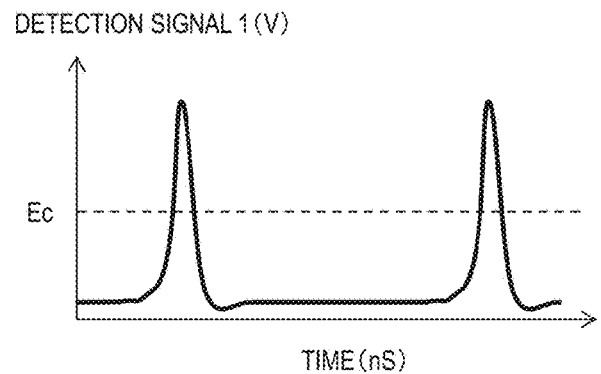
FIG. 11A illustrates an example of a detection signal 1 that represents the energy of a light beam traveling back along the laser beam path in Embodiment 2.
Figure 11B:
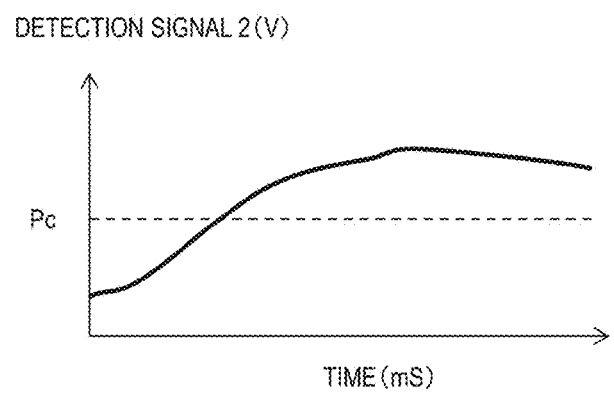
FIG. 11B illustrates an example of a detection signal 2 that represents the power of a light beam traveling back along the laser beam path in Embodiment 2.

FIGS. 11A and 11B illustrate examples of the detection signals 1 and 2, respectively. The detection signals 1 and 2 may be voltage signals. The laser controller 316 may determine whether the beam traveling back along the laser beam path includes a return beam, which is harmful for the laser apparatus 3, based on the detection signal 1. Furthermore, the laser controller 316 may determine whether the beam traveling back along the laser beam path includes a self-oscillation beam, which is harmful for the laser apparatus 3, based on the detection signal 2.

As shown in FIG. 11A, the laser controller 316 may determine whether the detection signal 1 exceeds a threshold Ec. The laser controller 316 may determine that a return beam is detected if the detection signal 1 exceeds the threshold Ec.

As shown in FIG. 11B, the laser controller 316 may determine whether the detection signal 2 exceeds a threshold Pc. The laser controller 316 may determine that a self-oscillation beam is detected if the detection signal 2 exceeds the threshold Pc.

Figure 12:
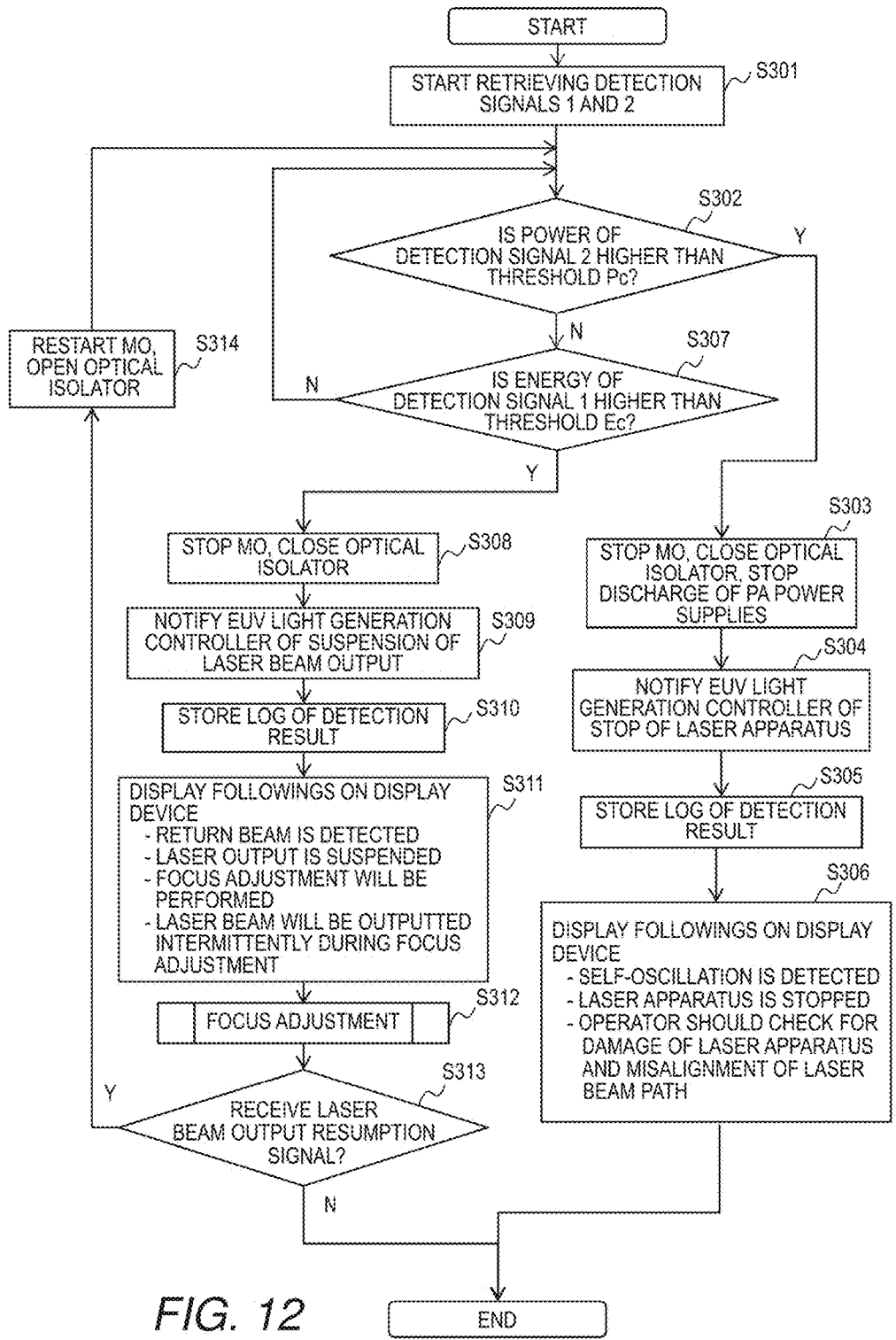
FIG. 12 is a flowchart of operation of the laser controller to detect and address a return beam or self-oscillation beam in Embodiment 2.

FIG. 12 is a flowchart of operation of the laser controller 316 to detect and address a return beam or self-oscillation beam. The laser controller 316 may start retrieving the detection signals 1 and 2 outputted by the photodetectors 331 and 332 (S301).

The laser controller 316 may determine whether the intensity of the detection signal 2 from the photodetector 332 is higher than the threshold Pc (S302). The threshold Pc may be a voltage representing a specific power. The threshold Pc may be predetermined based on the threshold for the damage of the optical elements included in the laser apparatus 3. The laser controller 316 may have different thresholds Pc depending on the operating conditions of the laser apparatus 3 (such as the output energy, the cycle, and the duty).

If the intensity of the detection signal 2 is higher than the threshold Pc (S302: Y), the laser controller 316 may determine that a self-oscillation beam is detected and perform the associated processing of S303 to S306. Steps S303 to S306 may be the same as Steps S105 to S108 in the flowchart of FIG. 8 described in Embodiment 1.

If the intensity of the detection signal 2 is equal to or lower than the threshold Pc (S302: N), the laser controller 316 may determine whether the intensity of the detection signal 1 from the photodetector 331 is higher than the threshold Ec (S307). The threshold Ec may be a voltage representing a specific energy. The threshold Ec may be predetermined based on the threshold for the damage of the optical elements included in the laser apparatus 3. The laser controller 316 may have different thresholds Ec depending on the operating conditions of the laser apparatus 3 (such as the output energy, the cycle, and the duty).

If the intensity of the detection signal 1 is higher than the threshold Ec (S307: Y), the laser controller 316 may determine that a return beam is detected and perform the associated processing of S308 to S314. Steps S308 to S314 may be the same as Steps S109 to S115 in the flowchart of FIG. 8 described in Embodiment 1.

The thresholds Ec and Pc may be stored in advance in the storage memory 1005 of the laser controller 316 by communication via a network, connection of a storage medium, or input through a console.

Figure 13:
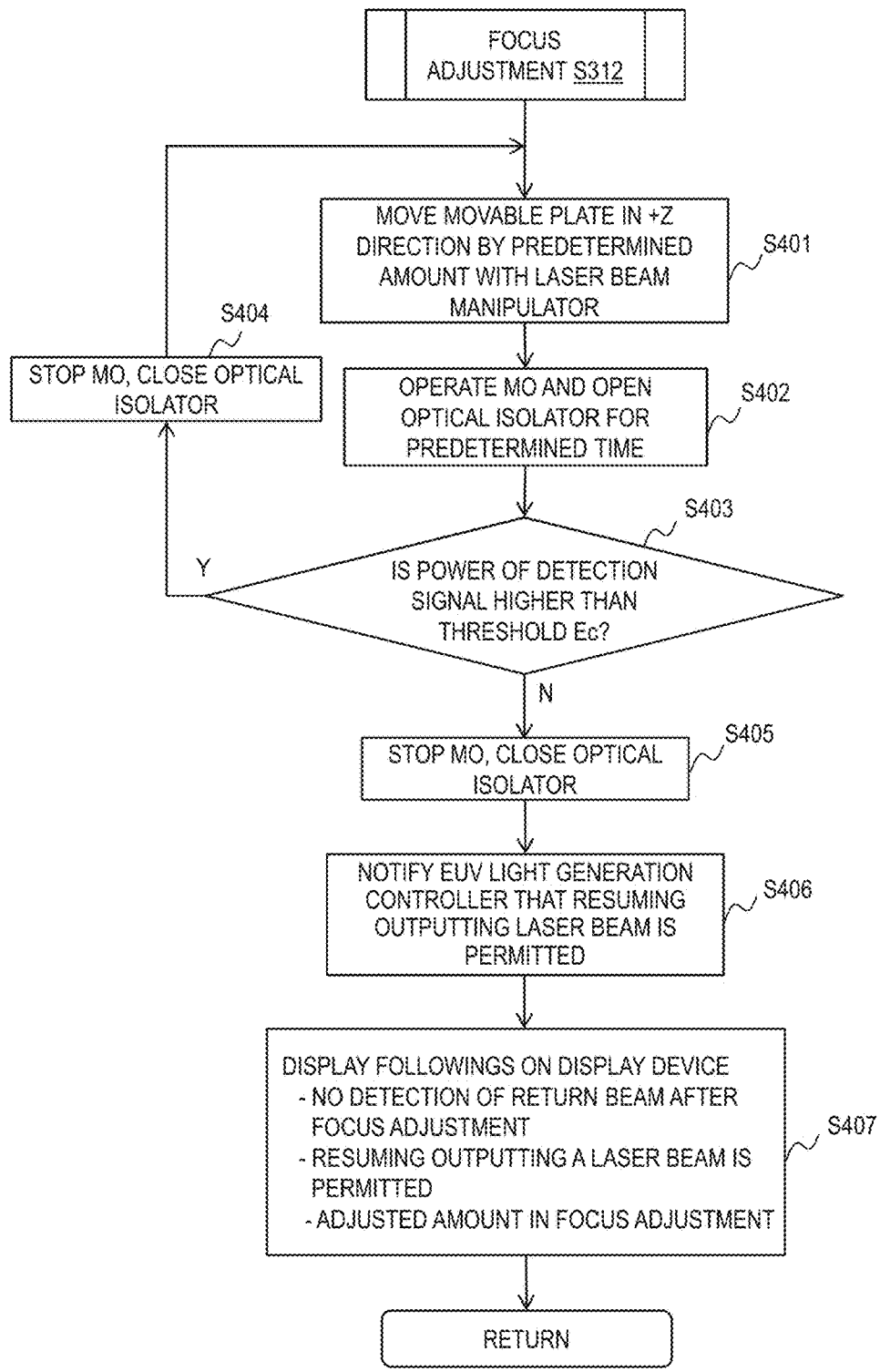
FIG. 13 is a detailed flowchart of focus adjustment in Embodiment 2.

For the focus adjustment S312, the laser controller 316 may employ a method different from the focus adjustment S113 in Embodiment 1. The laser controller 316 may perform the focus adjustment using the laser beam manipulator 84. FIG. 13 is a detailed flowchart of the focus adjustment S312 in the present embodiment.

The laser controller 316 moves the laser beam focusing optical system 22a in the +Z direction with the laser beam manipulator 84 by a predetermined amount (S401). Next, the laser controller 316 may make the master oscillator 310 output a pulse laser beam for a predetermined time and open the optical isolator 315 (S402). The predetermined time may be determined by experiment.

The laser controller 316 may determine whether the intensity of the detection signal 1 received from the photodetector 331 is higher than the threshold Ec (S403). If determining that the intensity of the detection signal 1 is higher than the threshold Ec (S403: Y), the laser controller 316 may stop the master oscillator 310 and close the optical isolator 315 (S404), and return to Step S401.

If determining at Step S403 that the intensity of the detection signal 1 is not higher than the threshold Ec (S403: N), the laser controller 316 may stop the master oscillator 310 and close the optical isolator 315 (S405). Further, the laser controller 316 may notify the EUV light generation controller 5 that resuming outputting a laser beam is permitted. The EUV light generation controller 5 may notify the exposure apparatus 6 that resuming outputting a laser beam is permitted.

The laser controller 316 may output the following information to the display device 335 (S407): (1) that the return beam is not detected because of the focus adjustment; (2) that resuming outputting a laser beam is permitted; and (3) the adjusted amount in the focus adjustment. The display device 335 may display information on these matters. The laser controller 316 may store the result of the focus adjustment to the log table.

Although the focus adjustment S312 has been described as a different method from the method of the focus adjustment S113 in Embodiment 1, it may be the same method.

Effects

The present embodiment may correctly determine whether a beam traveling back along the laser beam path is a return beam or self-oscillation beam that could damage optical elements, using detection signals from two photodetectors different in property. Since the present embodiment determines whether the beam traveling back along the laser beam path is light that could damage optical elements and appropriately address the problem, the damage of the optical elements may be prevented. If determining that the beam traveling back along the laser beam path is a return beam, the present embodiment may perform focus adjustment to reduce the return beam. Accordingly, even if the power of the laser beam is raised to increase the thermal lens effect of an optical element, the damage of the optical element may be prevented.

If determining that the beam traveling back along the laser beam path is a self-oscillation beam, the present embodiment may immediately stop the laser apparatus 3. Then, the operator may get a chance to check the optical elements for damage or misalignment.

When the gain of the amplifiers is raised with increase in power of the laser beam, slight damage of an optical element caused by a return beam may increase the frequency of generation of a self-oscillation beam. The present embodiment may detect a self-oscillation beam distinguishingly from a return beam to detect damage of an optical element at an earlier stage when the power of the laser beam is increased. The foregoing configuration may prevent optical elements from being damaged by a return beam or self-oscillation beam caused by increase in power of the pulse laser beam outputted from the laser apparatus 3, achieving stable operation of the laser apparatus 3.

6. Description of Components 6.1 Optical Isolator

Configuration

Figure 14:
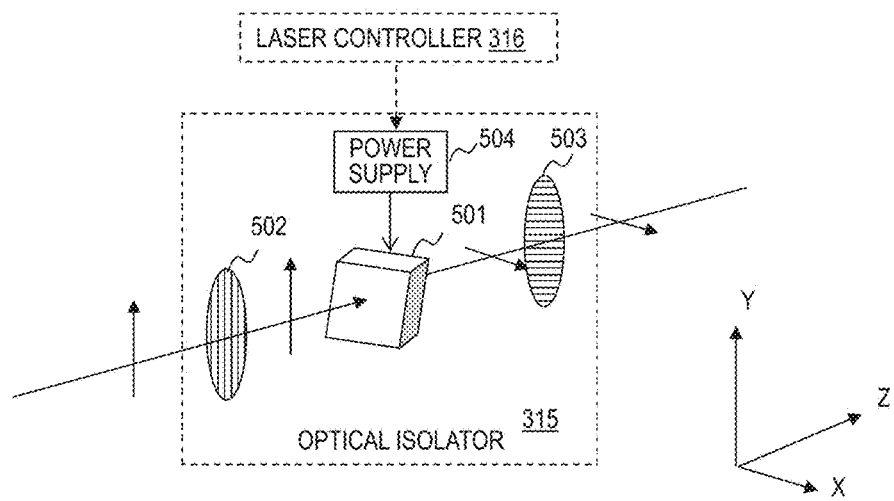
FIG. 14 illustrates a configuration example of an optical isolator.

FIG. 14 illustrates a configuration example of the optical isolator 315. The optical isolator 315 may include a Pockels cell 501, a first polarizer 502, a second polarizer 503, and a high-voltage power supply 504. The Pockels cell 501 may be either an EO Pockels cell or an AO Pockels cell.

The first polarizer 502 may be disposed on the beam path on the input side of the Pockels cell 501. The second polarizer 503 may be disposed on the beam path on the output side of the Pockels cell 501. The high-voltage power supply 504 may output control voltage for the Pockels cell 501. The high-voltage power supply 504 may receive a control signal from the laser controller 316.

The high-voltage power supply 504 may generate voltage predetermined but different from 0 V and apply the voltage to the Pockels cell 501 when the control signal is ON. The high-voltage power supply 504 may apply voltage of approximately 0 V to the Pockels cell 501 when the control signal is OFF.

Figure 15:
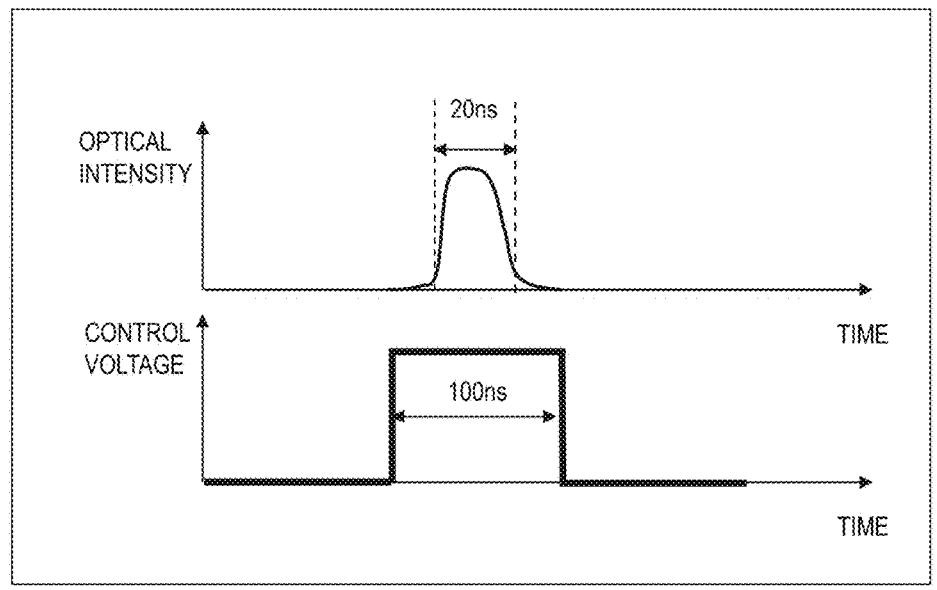
FIG. 15 illustrates a relationship between the temporal variation in light intensity of the pulse laser beam and the temporal variation in control voltage applied from a high-voltage power supply to a Pockels cell.

FIG. 15 illustrates a relation between the temporal variation in light intensity of the pulse laser beam and the temporal variation in control voltage applied from the high-voltage power supply 504 to the Pockels cell 501. The laser controller 316 may control the high-voltage power supply 504 to apply the predetermined voltage to the Pockels cell 501 synchronously with passage of the pulse laser beam outputted from the master oscillator 310 through the Pockels cell 501.

The time of applying the predetermined voltage may be longer than the pulse width of the passing pulse laser beam. For example, the pulse width may be 20 ns and the time of applying the predetermined voltage may be 100 ns. The above-described control of the optical isolator 315 may switch opening and closing the optical isolator 315 synchronously with the pulse laser beam.

Operation

The pulse laser beam entering the optical isolator 315 may travel in the Z direction. The pulse laser beam may be a beam polarized linearly in the Y direction. The first polarizer 502 may transmit the pulse laser beam polarized linearly in the Y direction at high transmittance and reflect light polarized linearly in the X direction in a direction different from the incident beam path.

The Pockels cell 501 may rotate the polarization direction of the pulse laser beam by 90 degrees and transmit the beam when the predetermined voltage is being applied. The Pockels cell 501 may transmit the pulse laser beam without changing its polarization direction when voltage at approximately 0 V is being applied.

The second polarizer 503 may transmit light polarized linearly in the X direction and reflect light polarized linearly in the Y direction in a direction different from the path of the pulse laser beam. That is to say, the second polarizer 503 may transmit the pulse laser beam of which the polarization direction is rotated by the Pockels cell 501 when the control voltage is the predetermined voltage. The second polarizer 503 may reflect the pulse laser beam of which the polarization direction is not rotated by the Pockels cell 501 in a direction different from the incident beam path when the control voltage is approximately 0 V.

As understood from the above, the optical isolator 315 may transmit light from the upstream and the downstream when the predetermined voltage is being applied to the Pockels cell 501 and block transmission of the light from both of the upstream and the downstream when the predetermined voltage is not being applied but the applied voltage is approximately 0 V, functioning as an optical isolator.

6.2 Beam Adjuster

Configuration

Figure 16A:
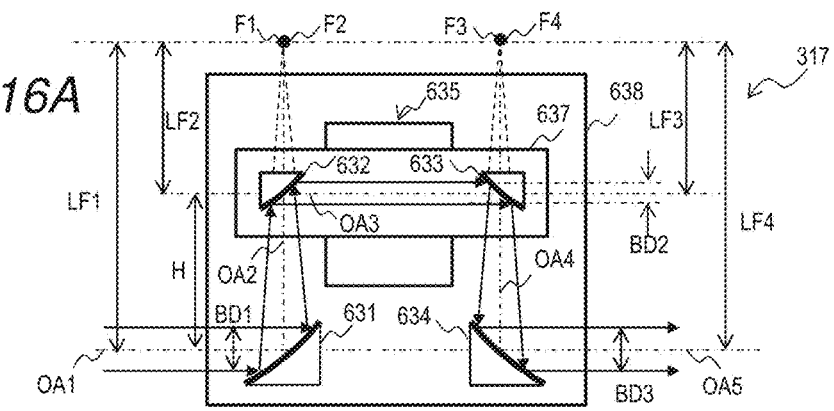
FIG. 16A illustrates a configuration example of a beam adjuster.

FIG. 16A illustrates a configuration example of the beam adjuster 317. The beam adjuster 317 may include two off-axis parabolic concave mirrors 631 and 634 and two off-axis parabolic convex mirrors 632 and 633. The off-axis parabolic concave mirror 631, the off-axis parabolic convex mirror 632, the off-axis parabolic convex mirror 633, and the off-axis parabolic concave mirror 634 may be disposed on and along the optical path of the pulse laser beam in this order.

In the state shown in FIG. 16A, the beam adjuster 317 may be configured so that the focal point F1 of the off-axis parabolic concave mirror 631 is located at the same position as the focal point F2 of the off-axis parabolic convex mirror 632. Furthermore, the beam adjuster 317 may be configured so that the focal point F3 of the off-axis parabolic convex mirror 633 is located at the same position as the focal point F4 of the off-axis parabolic concave mirror 634.

The off-axis parabolic concave mirrors 631, 634 and the off-axis parabolic convex mirrors 632, 633 may be disposed so that the optical axis OA2 between the off-axis parabolic concave mirror 631 and the off-axis parabolic convex mirror 632 is parallel to the optical axis OA4 between the off-axis parabolic convex mirror 633 and the off-axis parabolic concave mirror 634.

The off-axis parabolic concave mirrors 631, 634 and the off-axis parabolic convex mirrors 632, 633 may be disposed so that the optical axis OA1 of the pulse laser beam incident on the off-axis parabolic concave mirror 631 matches the optical axis OA5 of the pulse laser beam outgoing from the off-axis parabolic concave mirror 634.

The off-axis parabolic concave mirrors 631, 634 and the off-axis parabolic convex mirrors 632, 633 may be disposed so that the optical axis OA3 between the off-axis parabolic convex mirror 632 and the off-axis parabolic convex mirror 633 is parallel to the optical axis OA1 of the pulse laser beam incident on the off-axis parabolic concave mirror 631 and the optical axis OA5 of the pulse laser beam outgoing from the off-axis parabolic concave mirror 634.

The distance between the off-axis parabolic convex mirror 632 and the off-axis parabolic concave mirror 631 may be equal to the distance between the off-axis parabolic convex mirror 633 and the off-axis parabolic concave mirror 634. These distances are denoted by H.

The beam adjuster 317 may further include a base plate 638 and a one-axially movable stage 635. The one-axially movable stage 635 may include a movable plate 637 movable on the one-axially movable stage 635 in a one-axis direction.

The one-axially movable stage 635 may be disposed on the base plate 638 and configured to be able to move the movable plate 637 with respect to the base plate 638. The direction of moving the movable plate 637 may be parallel to the optical axis OA2 and the optical axis OA4. The off-axis parabolic concave mirrors 631 and 634 may be anchored to the base plate 638. The off-axis parabolic convex mirrors 632 and 633 may be anchored to the movable plate 637.

Operation

Figure 16B:
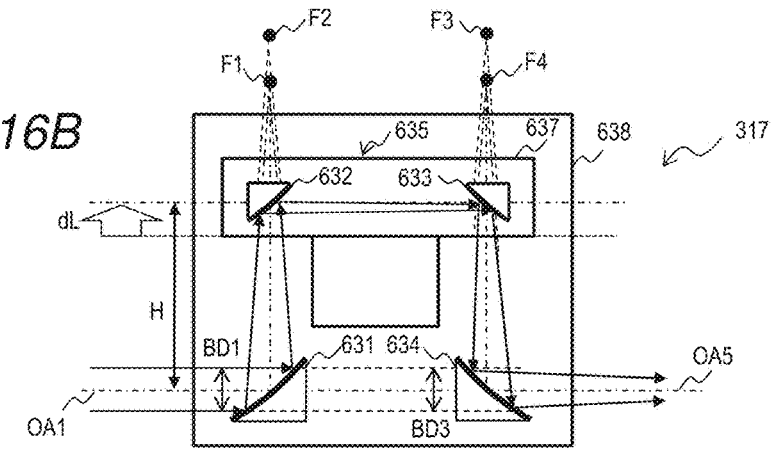
FIG. 16B illustrates a state of the beam adjuster where a movable plate is moved away from off-axis parabolic convex mirrors from the state shown in FIG. 16A.
Figure 16C:
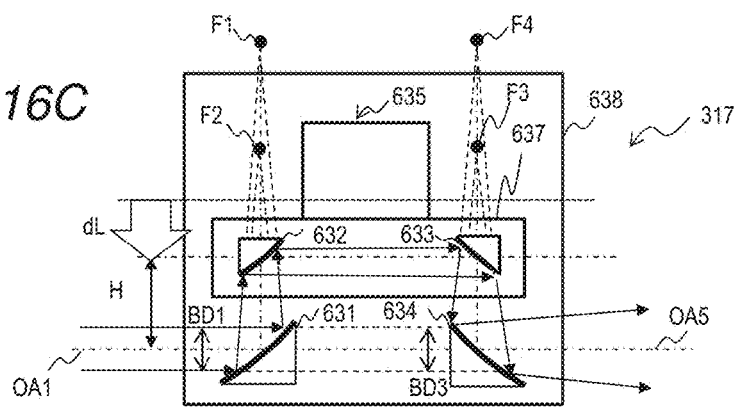
FIG. 16C illustrates a state of the beam adjuster where a movable plate is moved closer to the off-axis parabolic convex mirrors from the state shown in FIG. 16A.

The operation of the beam adjuster 317 is described with reference to FIGS. 16A to 16C. FIG. 16B shows a state of the beam adjuster 317 where the movable plate 637 is moved away from the off-axis parabolic concave mirrors 631 and 634 from the state shown in FIG. 16A. FIG. 16C shows a state of the beam adjuster 317 where the movable plate 637 is moved closer to the off-axis parabolic concave mirrors 631 and 634 from the state shown in FIG. 16A.

In FIG. 16A, the pulse laser beam to hit the off-axis parabolic concave mirror 631 may be a collimated beam. The off-axis parabolic concave mirror 631 may reflect the pulse laser beam to focus the pulse laser beam at the focal point F1. The off-axis parabolic convex mirror 632 may convert the pulse laser beam reflected by the off-axis parabolic concave mirror 631 and traveling to be focused at the focal point F1 into a collimated beam and reflect it. The beam diameter BD2 of the pulse laser beam converted by the off-axis parabolic convex mirror 632 into a collimated beam may be reduced to 1/M12 of the incident beam diameter BD1.

The focal length of the off-axis parabolic concave mirror 631 is defined as LF1 and the focal length of the off-axis parabolic convex mirror 632 is defined as LF2. As described above, the focal point F1 may be located at the same position as the focal point F2. The magnification M12 may be LF1/LF2. The distance H between the off-axis parabolic concave mirror 631 and the off-axis parabolic convex mirror 632 may be LF1-LF2.

The pulse laser beam converted into a collimated beam having a beam diameter BD2 may be reflected by the off-axis parabolic convex mirror 633 like a pulse laser beam that diverges from the focal point F3. As described above, the focal point F3 may be located at the same position as the focal point F4. Accordingly, the off-axis parabolic concave mirror 634 may convert the pulse laser beam diverging from the focal point F3 into a collimated beam having an optical axis OA5, which is substantially the same as the optical axis of the pulse laser beam incident on the off-axis parabolic concave mirror 631, and reflect it.

The beam diameter of the pulse laser beam reflected by the off-axis parabolic convex mirror 633 to hit the off-axis parabolic concave mirror 634 may be enlarged by a magnification M43. The focal length of the off-axis parabolic convex mirror 633 is defined as LF3 and the focal length of the off-axis parabolic concave mirror 634 is defined as LF4. The magnification M43 may be LF4/LF3. If LF1=LF4 and LF2=LF3, the magnification M12 may be equal to the magnification M43. Accordingly, the beam diameter BD3 of the outgoing light from the off-axis parabolic concave mirror 634 may be the same as the beam diameter BD1 of the pulse laser beam incident on the off-axis parabolic concave mirror 631.

The one-axially movable stage 635 may move the movable plate 637 with respect to the base plate 638 in accordance with the control of the laser controller 316. The laser controller 316 may increase or decrease the distance H between the off-axis parabolic concave mirror 631 and the off-axis parabolic convex mirror 632 by moving the movable plate 637. By changing the distance H, the laser controller 316 may collect or diverge the outgoing beam from the beam adjuster 317.

As shown in FIG. 16B, the laser controller 316 may increase the distance H from the state of FIG. 3A by dL. The divergence angle of the pulse laser beam outgoing from the off-axis parabolic concave mirror 634 may decrease. The beam diameter BD3 of the pulse laser beam outgoing from the off-axis parabolic concave mirror 634 may become slightly smaller than but substantially equal to the beam diameter BD1 of the pulse laser beam incident on the off-axis parabolic concave mirror 631. Furthermore, the optical axis OA1 of the pulse laser beam incident on the off-axis parabolic concave mirror 631 may match the optical axis OA5 of the pulse laser beam outgoing from the off-axis parabolic concave mirror 634.

As shown in FIG. 16C, the laser controller 316 may decrease the distance H from the state of FIG. 16A by dL. The divergence angle of the pulse laser beam outgoing from the off-axis parabolic concave mirror 634 may increase. The beam diameter BD3 of the pulse laser beam outgoing from the off-axis parabolic concave mirror 634 may become slightly larger than but substantially equal to the beam diameter BD1 of the pulse laser beam incident on the off-axis parabolic concave mirror 631. Furthermore, the optical axis OA1 of the pulse laser beam incident on the off-axis parabolic concave mirror 631 may match the optical axis OA5 of the pulse laser beam outgoing from the off-axis parabolic concave mirror 634.

6.3 Controllers

The aforementioned controllers in the present disclosure, inclusive of the laser controller 316 and the EUV light generation controller 5, may be configured with a general-use control apparatus, such as a computer or a programmable controller. For example, the controllers may have the following configuration.

Configuration

Figure 17:
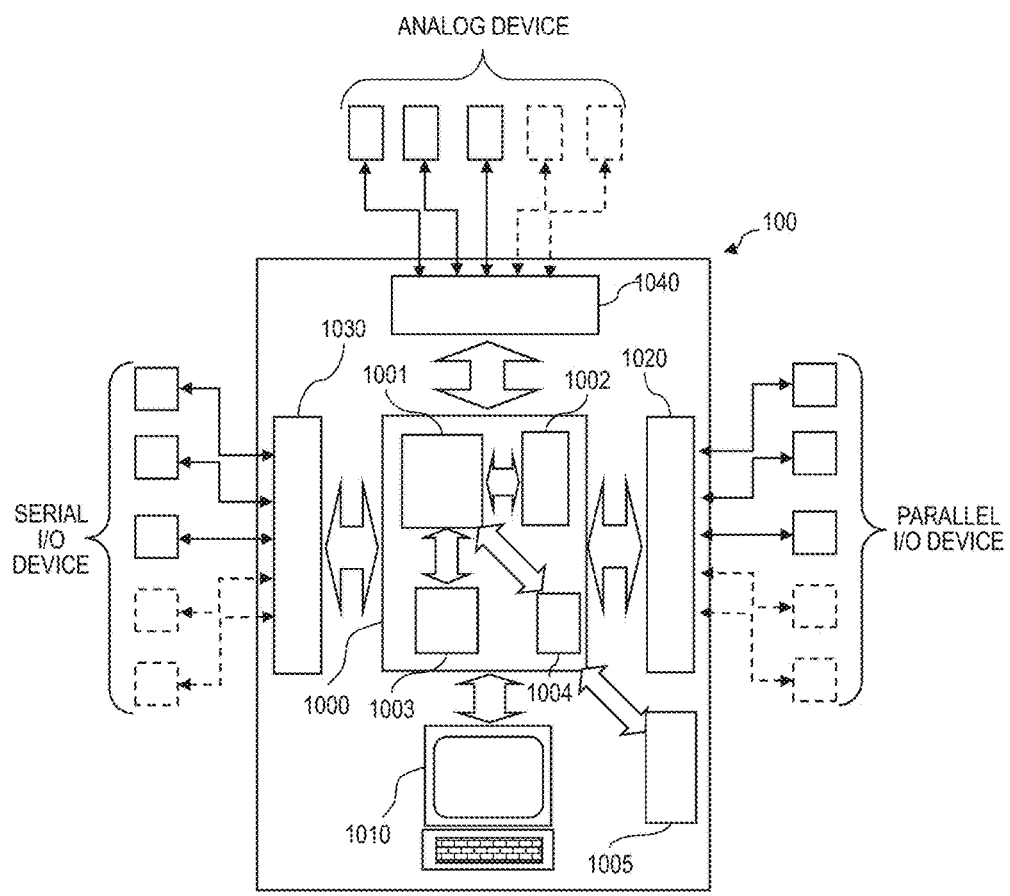
FIG. 17 is a configuration example of a controller.

FIG. 17 illustrates a configuration of a controller. The controller may include a processing unit 1000 and further, a storage memory 1005, a user interface 1010, a parallel I/O controller 1020, a serial I/O controller 1030, an A/D and D/A converter 1040 connected with the processing unit 1000. The processing unit 1000 may include a CPU 1001, and a memory 1002, a timer 1003, and a GPU 1004 connected with the CPU 1001.

Operation

The processing unit 1000 may retrieve a program stored in the storage memory 1005. The processing unit 1000 may execute the retrieved program, retrieve data from the storage memory 1005 in accordance with the executed program, and store data to the storage memory 1005.

The parallel I/O controller 1020 may be connected with a device that is capable of communicating via a parallel I/O port. The parallel I/O controller 1020 may control digital signal communication via the parallel I/O port performed by the processing unit 1000 executing a program.

The serial I/O controller 1030 may be connected with a device that is capable of communicating via a serial I/O port. The serial I/O controller 1030 may control digital signal communication via the serial I/O port performed by the processing unit 1000 executing a program.

The A/D and D/A converter 1040 may be connected with a device that is capable of communicating via an analog port. The A/D and D/A converter 1040 may control analog signal communication via the analog port performed by the processing unit 1000 executing a program.

The user interface 1010 may be configured for the operator to instruct the processing unit 1000 to display the process of executing a program, or abort or interrupt the execution of a program.

The CPU 1001 of the processing unit 1000 may perform arithmetic operation of a program. The memory 1002 may temporarily store a program or data generated in the arithmetic operation when the CPU 1001 executes the program. The timer 1003 may measure the time point or a passage time and output the time point or the passage time to the CPU 1001 in accordance with the executed program. The GPU 1004 may process image data received by the processing unit 1000 in accordance with the executed program and output the result to the CPU 1001.

Connected Devices

The devices that are connected with the parallel I/O controller 1020 and capable of communicating via a parallel I/O port may include the display device 335 and the other controllers. The devices that are connected with the serial I/O controller 1030 and capable of communicating via a serial I/O port may include the master oscillator 310, the PA power supplies 321 to 324, the optical isolator 315, the beam adjuster 317, and the laser beam manipulator 84. The devices that are connected with the A/D and D/A converter 1040 and capable of communicating via an analog port may include the photodetectors 328, 331, and 332.

The foregoing description is merely for the purpose of exemplification but not limitation. Accordingly, it is obvious for a person skilled in the art that the embodiments in this disclosure can be modified within the scope of the appended claims.

A part of the configuration of an embodiment can be replaced with a configuration of another embodiment. A configuration of an embodiment can be incorporated to a configuration of another embodiment. A part of the configuration of each embodiment can be removed, added to a different configuration, or replaced by a different configuration.

The terms used in this specification and the appended claims should be interpreted as "non-limiting". For example, the terms "include" and "be included" should be interpreted as "including the stated elements but not limited to the stated elements". The term "have" should be interpreted as "having the stated elements but not limited to the stated elements". Further, the modifier "one (a/an)" should be interpreted as "at least one" or "one or more."

What is claimed is:

1. A laser apparatus comprising:
a master oscillator configured to output a laser beam to travel along a laser beam path;
a plurality of amplifiers configured to amplify the laser beam outputted by the master oscillator on the laser beam path;
a photodetector including a first photodetector configured to detect energy of a light beam traveling back along the laser beam path and a second photodetector configured to detect power of the light beam traveling back along the laser beam path; and
a controller configured to receive an energy detection signal from the first photodetector and a power detection signal from the second photodetector, monitor intensities of the energy detection signal and the power detection signal, determine that a return beam is generated when the intensity of the energy detection signal exceeds a first threshold, determine that a self-oscillation beam is generated when the intensity of the power detection signal exceeds a second threshold, store determination results about the return beam and the self-oscillation beam to a memory, keep operation of the plurality of amplifiers and stop the master oscillator in a case of determining that a return beam is generated, and stop the master oscillator and the plurality of amplifiers in a case of determining that a self-oscillation beam is generated.

2. The laser apparatus according to claim 1, further comprising a display device,
wherein the controller is configured to output the determination results to the display device.

3. The laser apparatus according to claim 1, wherein the controller is configured to resume operation of the master oscillator and adjust a focus of a pulse laser beam with respect to a target in a case of determining that a return beam is generated.

4. An extreme ultraviolet light generation system configured to generate extreme ultraviolet light by irradiating a target with a pulse laser beam to generate plasma, the extreme ultraviolet light generation system comprising:
the laser apparatus according to claim 1 configured to output the pulse laser beam;
a chamber;
a target supply unit configured to supply a target into the chamber; and
a laser beam focusing optical system configured to focus the pulse laser beam outputted by the laser apparatus onto the target.

5. The laser apparatus according to claim 1, wherein the second threshold is a voltage representing a specific power.

6. The laser apparatus according to claim 1, wherein the second threshold is predetermined based on a threshold for damage of optical elements included in the laser apparatus.

7. The laser apparatus according to claim 1, wherein the second threshold is selected from different thresholds depending on operating conditions of the laser apparatus.

8. The laser apparatus according to claim 1, wherein the first threshold is a voltage representing a specific energy.

9. The laser apparatus according to claim 1, wherein the first threshold is predetermined based on a threshold for damage of optical elements included in the laser apparatus.

10. The laser apparatus according to claim 1, wherein the first threshold is selected from different thresholds depending on operating conditions of the laser apparatus.

11. The laser apparatus according to claim 3, wherein the controller is configured to move a laser beam focusing optical system in a direction by a predetermined amount to adjust the focus.

12. The laser apparatus according to claim 3, wherein the controller is configured to adjust the focus for the energy detection signal from the first photodetector to become equal to or less than the first threshold.

13. The laser apparatus according to claim 3, wherein the controller is configured to repeat moving a laser beam focusing optical system in a direction by a predetermined amount until the energy detection signal from the first photodetector becomes equal to or less than the first threshold.

14. A laser apparatus comprising:
a master oscillator configured to output a laser beam to travel along a laser beam path;
a plurality of amplifiers configured to amplify the laser beam outputted by the master oscillator on the laser beam path;
a photodetector device configured to detect a light beam traveling back along the laser beam path; and
a controller configured to determine that a return beam is generated when intensity of a detection signal from the photodetector device has been higher than a first threshold for a time longer than 0 and equal to or shorter than a second threshold, determine that a self-oscillation beam is generated when intensity of the detection signal has been higher than a third threshold for a time longer than a fourth threshold which is equal to or longer than the second threshold, and store determination results about the return beam and the self-oscillation beam to a memory.

15. The laser apparatus according to claim 14,
wherein the photodetector device includes a single photodetector, and
wherein the first threshold and the third threshold are the same value and the second threshold and the fourth threshold are the same value.

16. An extreme ultraviolet light generation system configured to generate extreme ultraviolet light by irradiating a target with a pulse laser beam to generate plasma, the extreme ultraviolet light generation system comprising:
- the laser apparatus according to claim 14 configured to output the pulse laser beam;
- a chamber;
- a target supply unit configured to supply a target into the chamber; and
- a laser beam focusing optical system configured to focus the pulse laser beam outputted by the laser apparatus onto the target.

* * * * *